(12) United States Patent
Wang

(10) Patent No.: US 10,641,241 B2
(45) Date of Patent: May 5, 2020

(54) NEGATIVE-PRESSURE SUCTION-TYPE FLUID-DRIVING DYNAMICAL MACHINE

(71) Applicant: Zijie Wang, Tianjin (CN)

(72) Inventor: Zijie Wang, Tianjin (CN)

(*) Notice: Subject to any disclaimer, the term of this patent is extended or adjusted under 35 U.S.C. 154(b) by 276 days.

(21) Appl. No.: 15/825,096

(22) Filed: Nov. 28, 2017

(65) Prior Publication Data

US 2018/0156192 A1 Jun. 7, 2018

Related U.S. Application Data

(63) Continuation of application No. PCT/CN2015/000374, filed on Jun. 1, 2015.

(51) Int. Cl.
*B60L 8/00* (2006.01)
*F03D 3/00* (2006.01)
(Continued)

(52) U.S. Cl.
CPC .............. *F03D 3/002* (2013.01); *B60L 8/003* (2013.01); *B60L 8/006* (2013.01); *B60L 50/90* (2019.02); *F03D 3/04* (2013.01); *F03D 3/0436* (2013.01); *F03D 7/06* (2013.01); *F03D 9/007* (2013.01); *F03D 9/11* (2016.05); *F03D 9/25* (2016.05); *F03D 9/32* (2016.05); *F03D 80/00* (2016.05); *H02J 7/1415* (2013.01); *H02J 7/35* (2013.01); *H02S 10/12* (2014.12); *H02S 20/30* (2014.12); *B60L 2200/10* (2013.01); *B60L 2200/12* (2013.01); *B60L 2200/26* (2013.01); *B60L 2200/32* (2013.01); *B62K 2204/00* (2013.01); *B62M 6/00* (2013.01); *B62M 6/80* (2013.01); *B62M 6/85* (2013.01); *B62M 7/00* (2013.01); *B62M 2007/005* (2013.01); *F05B 2220/706* (2013.01); *F05B 2220/708* (2013.01); *F05B 2240/121* (2013.01); *F05B 2240/123* (2013.01);
(Continued)

(58) Field of Classification Search
CPC ................ B60K 6/12; B60K 2006/123; B60K 2016/006; B60L 8/006
USPC .................................................. 180/165, 2.2
See application file for complete search history.

(56) References Cited

U.S. PATENT DOCUMENTS 3,556,239 A * 1/1971 Spahn ...................... B60K 6/48
180/65.25
3,876,925 A * 4/1975 Stoeckert ............... B60K 16/00
322/1
(Continued)

*Primary Examiner* — Jeffrey J Restifo
(74) *Attorney, Agent, or Firm* — Wayne & Ken, LLC; Tony Hom

(57) ABSTRACT

A negative pressure air suction type fluid-driven power machine comprises a fluid pressure accumulation bin, a necking port, a flow inlet, a flow guiding cover, a fluid-inlet flow guiding cover, turbine driving blades, a turbine housing, a turbine shaft, a turbine bracket, nozzles surrounding peripheries of the turbine driving blades, a turbine fluid outlet, a fluid negative-pressure flow guiding cover, a fluid negative-pressure outlet, an external driving fluid inlet, an external driving fluid flow guiding cover, and nozzles. The negative pressure air suction type fluid-driven power machine is formed using a gravity acceleration fluid generated by a fluid flowing to a direction opposite to operation of an object as a main driving power source and using a fluid air suction phenomenon as an auxiliary power source, and can replace some effects of steam engines, internal combustion engines, motors and the like.

18 Claims, 20 Drawing Sheets

(51) Int. Cl.
  *F03D 3/04* (2006.01)
  *F03D 9/32* (2016.01)
  *B60L 50/90* (2019.01)
  *H02S 20/30* (2014.01)
  *H02S 10/12* (2014.01)
  *F03D 9/11* (2016.01)
  *F03D 9/25* (2016.01)
  *F03D 80/00* (2016.01)
  *F03D 7/06* (2006.01)
  *F03D 9/00* (2016.01)
  *H02J 7/14* (2006.01)
  *H02J 7/35* (2006.01)
  *B62M 6/85* (2010.01)
  *B62M 6/00* (2010.01)
  *B62M 6/80* (2010.01)
  *B62M 7/00* (2010.01)
  *H02S 99/00* (2014.01)

(52) U.S. Cl.
  CPC .......... *F05B 2270/32* (2013.01); *H02S 99/00* (2013.01); *Y02E 10/728* (2013.01); *Y02E 10/74* (2013.01); *Y02E 10/766* (2013.01)

(56) References Cited

U.S. PATENT DOCUMENTS

| | | | | |
|---|---|---|---|---|
| 4,134,469 A * | 1/1979 | Davis | ........... | B60K 6/48 180/2.2 |
| 4,282,948 A * | 8/1981 | Jerome | ........... | B60K 6/105 180/165 |
| 4,336,856 A * | 6/1982 | Gamell | ........... | B60K 3/04 180/165 |
| 4,423,368 A * | 12/1983 | Bussiere | ........... | F03D 9/25 322/35 |
| 5,280,827 A * | 1/1994 | Taylor | ........... | B60K 1/04 180/165 |
| 5,296,746 A * | 3/1994 | Burkhardt | ........... | H02J 7/34 290/55 |
| 5,798,593 A * | 8/1998 | Salter, II | ........... | B60L 50/30 310/166 |
| 5,828,137 A * | 10/1998 | Selfors | ........... | F01D 15/02 290/52 |
| 6,138,781 A * | 10/2000 | Hakala | ........... | F03D 9/32 180/2.2 |
| 6,758,295 B2 * | 7/2004 | Fleming | ........... | B60K 6/10 180/165 |
| 6,882,059 B1 * | 4/2005 | DePaoli | ........... | B60K 16/00 290/44 |
| 7,387,182 B2 * | 6/2008 | Fleming | ........... | B60K 6/48 180/165 |
| 7,398,841 B2 * | 7/2008 | Kaufman | ........... | B60K 6/12 180/2.2 |
| 7,854,278 B2 * | 12/2010 | Kaufman | ........... | B60K 6/12 180/2.2 |
| 7,997,371 B2 * | 8/2011 | Khymych | ........... | B60K 16/00 180/165 |
| 8,087,487 B2 * | 1/2012 | Mustafa | ........... | B60K 3/04 123/559.1 |
| 8,162,589 B2 * | 4/2012 | Moore | ........... | F03D 9/32 415/4.2 |
| 8,181,724 B2 * | 5/2012 | Cong | ........... | F03D 3/005 180/2.2 |
| 8,235,150 B2 * | 8/2012 | Mustafa | ........... | F02B 33/40 123/243 |
| 8,240,416 B2 * | 8/2012 | Cong | ........... | F03D 9/32 180/165 |
| 8,646,550 B2 * | 2/2014 | Penev | ........... | B60L 8/003 180/2.2 |
| 8,653,681 B2 * | 2/2014 | Whinnery | ........... | F02N 11/0866 180/165 |
| 8,967,302 B2 * | 3/2015 | Tran | ........... | B60K 16/00 180/2.2 |
| 9,059,601 B2 * | 6/2015 | Rogers | ........... | B60L 50/51 |
| 9,428,061 B1 * | 8/2016 | Ripley | ........... | B60L 8/006 |
| 10,358,039 B1 * | 7/2019 | Frierman | ........... | F03D 9/25 |

* cited by examiner

NEGATIVE-PRESSURE SUCTION-TYPE FLUID-DRIVING DYNAMICAL MACHINE

TECHNICAL FIELD

The present disclosure belongs to a novel power machine, and particularly relates to a negative pressure air suction type fluid-driven power machine having a plurality of driving points.

BACKGROUND

In the 1970s, some traction locomotives of France and Germany are introduced into Chinese railways, and the traction locomotives of France and Germany adopt operating gravity center floating protection technology and system streamlining. In operation of a train, fluids flowing to a direction opposite to the operation of the train along a periphery of the traction locomotive enable an operating gravity center of the traction locomotive to generate a floating protection phenomenon, which indicates that a kinetic energy of the fluids flowing in the direction opposite to the operation of the object along the periphery of a running object shall not be underestimated.

In addition, in 1654, a well-known "Magdeburg hemisphere experiment" was conducted in the plaza of Magdeburg, Germany, where a spectacle that a large number of violent-tempered horses pull two vacuum sucked hemispheres appeared.

A differential pressure air suction force created by vacuum in spheres and external atmospheric pressure, a differential pressure resistance in a flight principle of airplanes, and "the vacuum generated at a rear part of the train makes the train have a power to retreat backwards" in air resistance of train operation of a steam locomotive science indicate that the negative pressure air suction force shall not be underestimated and also indicate that a negative pressure air suction effect of an operating rear part of a moving object in the operation of the moving object is an opposite power which shall not be underestimated.

Therefore, in view of a special geography of China's Qinghai-Tibet Railway and inadaptability of a special frozen soil layer to conventional trains, natural phenomena such as the frozen soil layer, blue sky, white clouds and slightly lower atmospheric pressure of the Qinghai-Tibet Plateau make me wonder that it will be perfect if a power-dispersed rail-wheel train which uses solar photovoltaics, air flow and the like to generate electricity exists. Thus, a "negative pressure air suction type fluid-driven turbine" and a matched power-dispersed rail-wheel train are designed in the background, and then are evolved into a negative pressure air suction type fluid-driven power machine.

In particular, the "global warming phenomenon", "climate change" and like caused by global population expansion, various crises formed by continuous decreasing of per capita possession and some old survival modes of people today threaten survival of people and force people to explore new kinetic energy and new survival modes. Therefore, the "negative pressure air suction type fluid-driven power machine" should be a novel power machine urgently needed by people today.

SUMMARY

The present disclosure is a novel power machine formed by resistance fluids generated during operation of an object by inducing a flow guiding apparatus via a negative pressure air suction type fluid-driven turbine.

A negative pressure air suction type fluid-driven power machine of the present disclosure is an auxiliary power machine formed by using a gravity acceleration fluid generated by a fluid flowing to a direction opposite to the operation of the object at a lower part of the object in operation at runtime of the object as a main driving power source and using a fluid air suction phenomenon generated by other fluids flowing to the direction opposite to the operation of the object along a periphery of a moving object as an auxiliary power source, wherein the negative pressure air suction type fluid-driven power machine comprises a fluid pressure accumulation bin, a necking port for the fluid to flow into the fluid pressure accumulation bin, a flow inlet for the fluid to flow into the fluid pressure accumulation bin, a flow guiding cover for the fluid to flow into the fluid pressure accumulation bin, a fluid-inlet flow guiding cover, turbine driving blades, a turbine housing, a turbine shaft, a turbine bracket, nozzles surrounding peripheries of the turbine driving blades for driving the fluid to flow into the necking port, a turbine fluid outlet, a fluid negative-pressure flow guiding cover, a fluid negative-pressure outlet, an external driving fluid inlet, an external driving fluid flow guiding cover, nozzles for external driving fluid to flow out of the necking port, an external driving fluid-inlet intercepting cover, as well as pressure reducing grooves and pressure boosting grooves formed inside and outside the turbine driving blades.

Further, the negative pressure air suction type fluid-driven power machine further comprises a fluid dust collection net and a fluid filtering net for purifying the first fluid, and further comprises an external driving fluid filtering net for purifying the second fluid.

Further, the negative pressure air suction type fluid-driven power machine further comprises a fluid-inlet intercepting cover for intercepting the first fluid, and further comprises an external driving fluid-inlet intercepting cover for intercepting the second fluid.

An electric generator can be mounted at a shaft center of the turbine shaft; and an inducting flow guiding motor and a flow guiding propeller can be mounted on an automobile, a ship and an aircraft.

The present disclosure has the following advantages:

1. The negative pressure air suction type fluid-driven power machine of the present disclosure is mounted on some travel tools of people; a novel power machine can be formed in inducing of the inducing apparatus and driving of the resistance fluids during operation of some travel tools of people and can replace some effects of steam engines, internal combustion engines, motors and the like; 2. the negative pressure air suction type fluid-driven power machine of the present disclosure can save a large amount of energy and avoid environmental pollution; and 3. the negative pressure air suction type fluid-driven power machine of the present disclosure has a wide scope of application, and can save more energy resources for people and also create many excellent effects in alleviation of the "global warming phenomenon" and the "climate change" and reasonable coexistence between people and nature if the negative pressure air suction type fluid-driven power machine is applied together with solar energy.

BRIEF DESCRIPTION OF THE DRAWINGS

The present disclosure is further described in derear below in combination with drawings and specific embodiments.

DETAILED DESCRIPTION OF THE DISCLOSURE

The present disclosure is further described below in combination with drawings and embodiments.

1. Airflow-Assisted Bicycle

Figure 1:
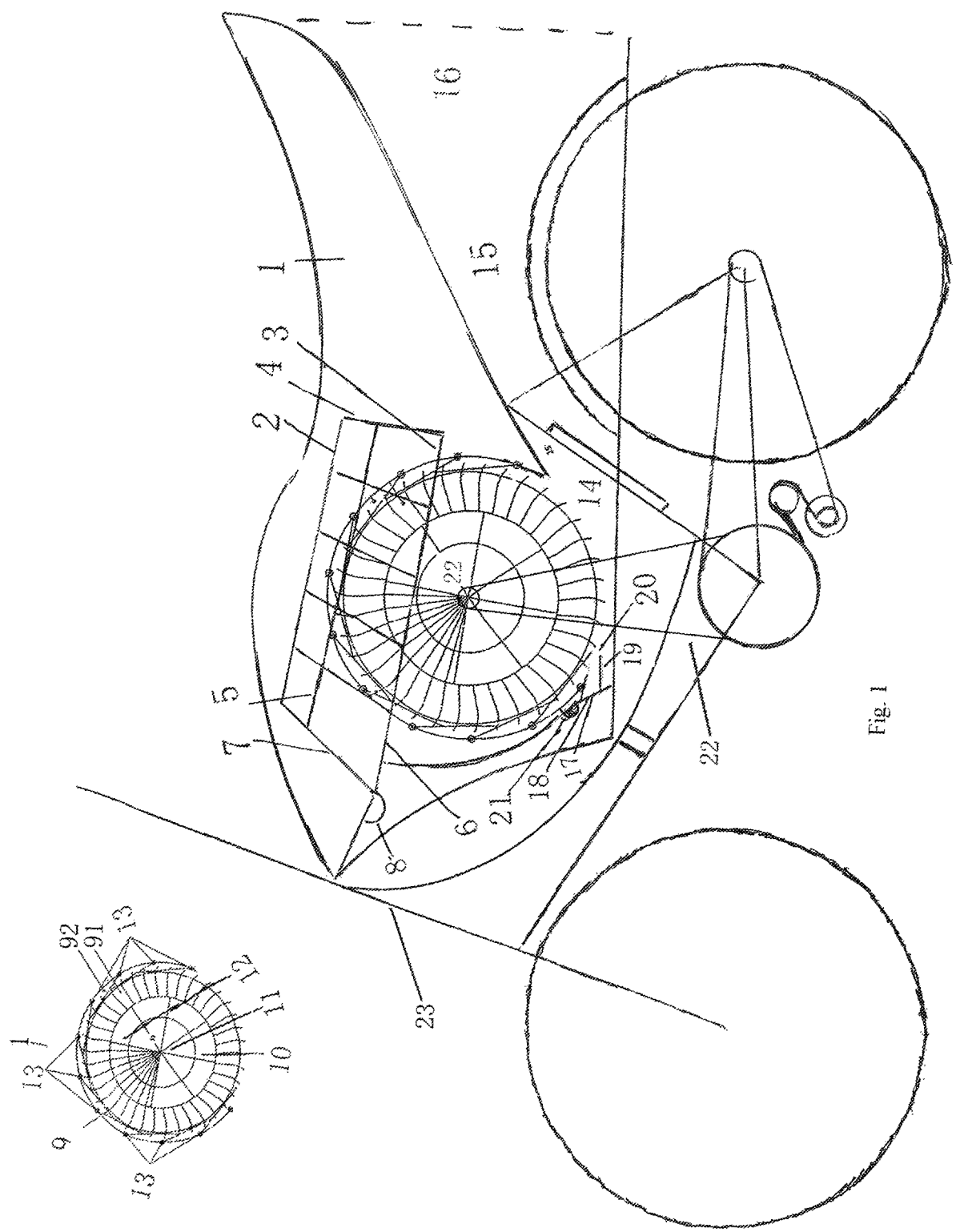
FIG. 1 is a schematic diagram of application of an airflow-assisted bicycle.
Figure 11:
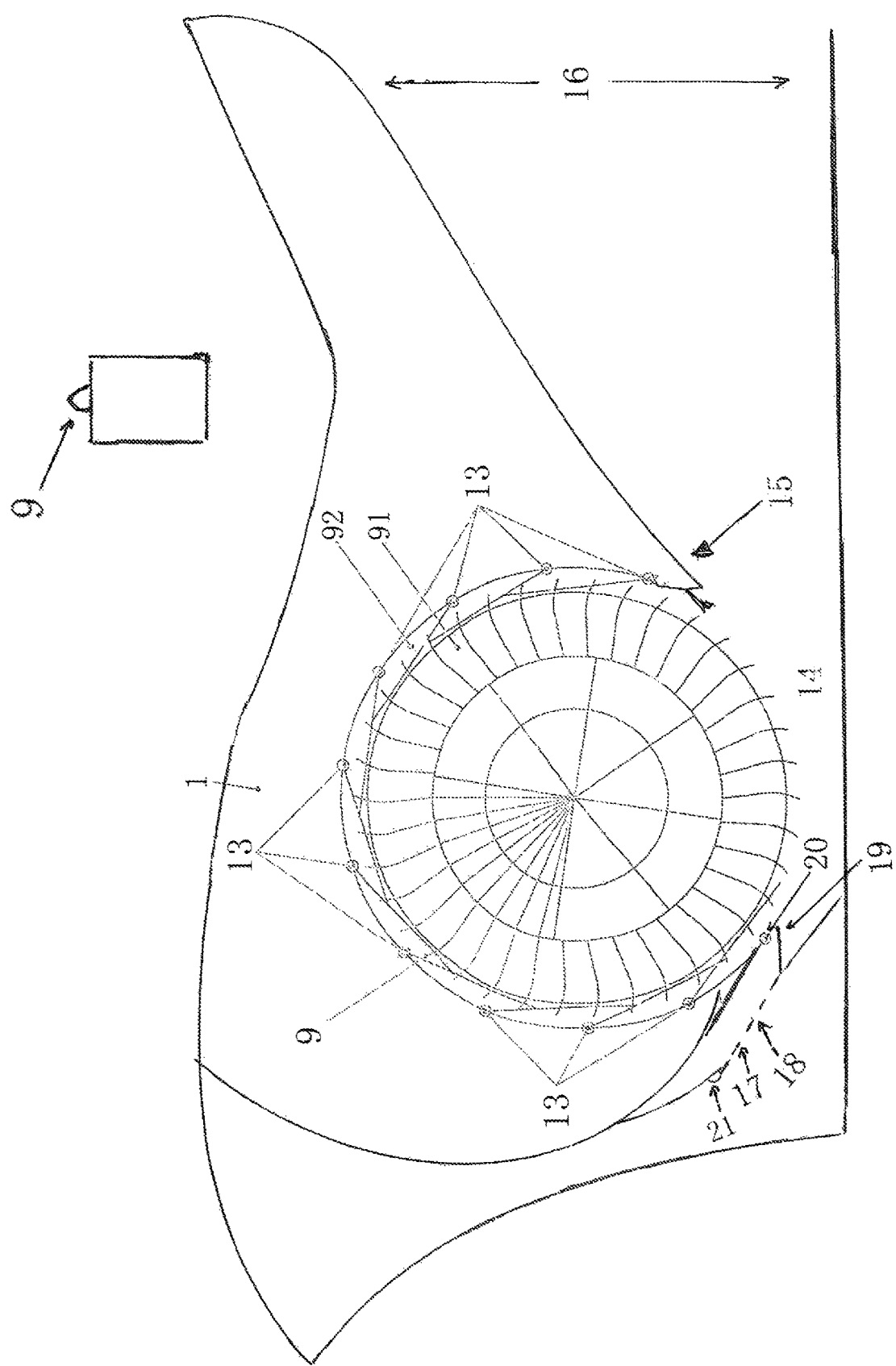
FIG. 11 is a structural schematic diagram of a negative pressure air suction type fluid-driven power machine.

As shown in FIG. 1 and FIG. 11, the airflow-assisted bicycle is mainly composed of a fluid pressure accumulation bin 1, a necking port 2 for a fluid to flow into the fluid pressure accumulation bin 1, a flow inlet 3 for the fluid to flow into the fluid pressure accumulation bin 1, a flow guiding cover 4 for the fluid to flow into the fluid pressure accumulation bin 1, a fluid dust collection net 5, a fluid filtering net 6, a fluid-inlet flow guiding cover 7, a fluid-inlet intercepting cover 8, turbine driving blades 9, a turbine housing 10, a turbine shaft 11, a turbine bracket 12, nozzles 13 surrounding peripheries of the turbine driving blades for driving the fluid to flow into the necking port, a turbine fluid outlet 14, a fluid negative-pressure flow guiding cover 15, a fluid negative-pressure outlet 16, an external driving fluid inlet 17, an external driving fluid filtering net 18, an external driving fluid flow guiding cover 19, nozzles 20 for external driving fluid to flow out of the necking port, an external driving fluid-inlet intercepting cover 21, pressure reducing grooves and pressure boosting grooves formed inside and outside the turbine driving blades, a power assisting transmission apparatus 22, an adjusting apparatus 23 for the fluid to flow into the intercepting cover and the like. An external driving fluid can be led out of the fluid pressure accumulation bin 1.

In moving of the airflow-assisted bicycle, part of gravity acceleration fluid flowing to a direction opposite to the moving of the bicycle along the bottom of a negative pressure air suction type fluid-driven power machine carried by the bicycle flows into the flow inlet 3 for the fluid to flow into the fluid pressure accumulation bin 1 through the fluid filtering net 6; and then the fluid flows into the fluid pressure accumulation bin 1 through the fluid-inlet flow guiding cover 7, the fluid dust collection net 5, the flow guiding cover 4 for the fluid to flow into the fluid pressure accumulation bin, and the necking port 2 for the fluid to flow into the fluid pressure accumulation bin. Since the fluid flowing into the fluid pressure accumulation bin 1 is the gravity acceleration fluid, with increase of a vehicle body moving speed, a density and a pressure intensity of the gravity acceleration fluid flowing into the fluid pressure accumulation bin 1 are also increased. The pressure fluid in the fluid pressure accumulation bin 1 is sprayed to the turbine driving blades 9 by the nozzles 13 surrounding peripheries of the turbine driving blades for driving the fluid to flow into the necking port, so that a plurality of driven turbine driving blades 9 enable the turbine shaft 11 to rotate easily through a plurality of hidden levers formed by the turbine bracket 12 and a turbine shaft center. Meanwhile, part of resistance fluid flowing to the direction opposite to the moving of the bicycle along the front of the moving bicycle drives the turbine driving blades 9 by the turbine driving fluid sprayed through the external driving fluid filtering net 18, the external driving fluid low inlet 17, the external driving fluid flow guiding cover 19 and the nozzles 20 for external driving fluid to flow out of the necking port, and also induce a plurality of turbine driving fluids sprayed by the nozzles 13 surrounding peripheries of the turbine driving blades for driving the fluid to flow into the necking port to be discharged from the fluid outlet 14 and to flow into an inner side of the fluid negative-pressure flow guiding cover 15. Another part of the resistance fluid flows to the direction opposite to the moving of the bicycle through exteriors of the fluid negative-pressure flow guiding cover 15 and the fluid negative-pressure outlet 16. A negative pressure-assisted air suction force is established outside the fluid negative-pressure outlet 16 by utilizing a flow velocity of the resistance fluid formed by a bicycle moving speed to promote the turbine driving fluid to be discharged from the interior of the fluid negative-pressure flow guiding cover 15 as soon as possible and increase working efficiency of a power machine, thereby forming the negative pressure air suction type fluid-driven power machine of the bicycle. When the external driving fluid is led out of the fluid pressure accumulation bin 1, the external driving fluid-inlet intercepting cover 21 is canceled naturally.

The easily rotated turbine shaft 11 drives a bicycle driving wheel disk through transmission of the power assisting transmission apparatus 22 to form an auxiliary power of the "airflow-assisted bicycle". When the moving bicycle needs to reduce the auxiliary power, the fluid-inlet intercepting cover 8 is opened by the adjusting apparatus 23 for the fluid to flow into the intercepting cover, and part of a fluid flow inlet of the flow inlet 3 for the fluid to flow into the fluid pressure accumulation bin 1 is closed, so as to reduce the flow rate of some fluids flowing into the fluid pressure accumulation bin 1, reduce some effects of the negative pressure air suction type fluid-driven power machine, and reduce the auxiliary power of the airflow-assisted bicycle.

In addition, in moving of the vehicle body, when the plurality of turbine driving fluids of the negative pressure air suction type fluid-driven power machine flow to a rear part of the running vehicle body through the turbine fluid outlet 14, the fluid negative-pressure flow guiding cover 15 and the fluid negative-pressure outlet 16; and the part of fluids fill some fluids required by a negative pressure region formed by the fluids in the rear of the running vehicle body, thereby alleviating some influences that vacuum generated in the rear of the moving vehicle body makes the vehicle body have a power to retreat backwards and reducing some moving resistance of the vehicle body. The pressure intensity of the turbine driving fluid is adjusted by the pressure reducing grooves 91 and the pressure boosting grooves 92 formed inside and outside the turbine driving blades 9. When the pressure intensity of the fluids in the pressure reducing grooves 91 inside the turbine driving blades is low, the pressure fluids in the external fluid pressure boosting grooves flow into the fluid pressure reducing grooves. Meanwhile, the pressure intensity of the fluids in the pressure boosting grooves 92 is increased by utilizing a centrifugal phenomenon of the fluids when a turbine is rotated, thereby promoting continuity and stability of a turbine driving force (fluid).

When the moving bicycle does not need the negative pressure air suction type fluid-driven power machine to assist work or the negative air pressure air suction type fluid-driven power machine has a failure, the fluid-inlet intercepting cover 8 and the external driving fluid-inlet intercepting cover 21 are opened, and the turbine driving fluid flow inlet of the negative pressure air suction type fluid-driven power machine is closed to stop work of the negative pressure air suction type fluid-driven power machine.

Figure 2:
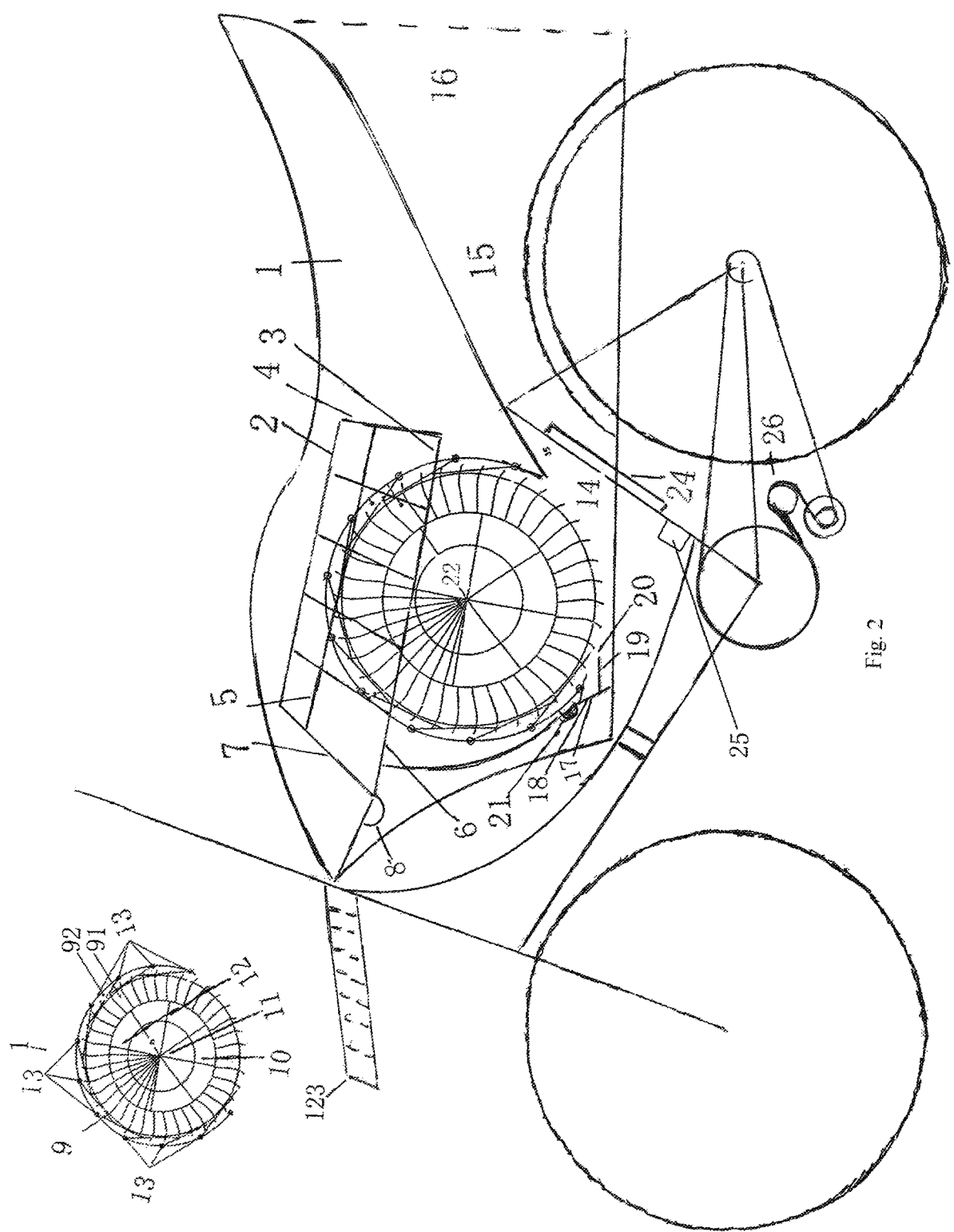
FIG. 2 is a schematic diagram of application of an electric bicycle using solar photovoltaics and airflow to generate electricity.

2. Electric Bicycle Using Solar Photovoltaics and Airflow to Generate Electricity As shown in FIG. 2 and FIG. 11, the electric bicycle using solar photovoltaics and airflow to generate electricity is mainly composed of a fluid pressure accumulation bin 1, a necking port 2 for a fluid to flow into the fluid pressure accumulation bin 1, a flow inlet 3 for the fluid to flow into the fluid pressure accumulation bin 1, a flow guiding cover 4 for the fluid to flow into the fluid pressure accumulation bin 1, a fluid dust collection net 5, a fluid filtering net 6, a fluid-inlet flow guiding cover 7, a fluid-inlet intercepting cover 8, turbine driving blades 9, a turbine housing 10, a turbine shaft 11, a turbine bracket 12, nozzles 13 surrounding peripheries of the turbine driving blades for driving the fluid to flow into the necking port, a turbine fluid outlet 14, a fluid negative-pressure flow guiding cover 15, a fluid negative-pressure outlet 16, an external driving fluid inlet 17, an external driving fluid filtering net 18, an external driving fluid flow guiding cover 19, nozzles 20 for external driving fluid to flow out of the necking port, an external driving fluid-inlet intercepting cover 21, pressure reducing grooves 91 and pressure boosting grooves 92 formed inside and outside the turbine driving blades, an electric generator 22, solar photovoltaic batteries 123, a storage battery 24, an electric energy conversion apparatus 25, a driving motor 26 and the like.

In moving of the electric bicycle using solar photovoltaics and airflow to generate electricity, part of gravity acceleration fluid flowing to a direction opposite to the moving of the bicycle along the bottom of a negative pressure air suction type fluid-driven power machine carried by the electric bicycle flows into the flow inlet 3 for the fluid to flow into the fluid pressure accumulation bin 1 through the fluid filtering net 6; and then the fluid flows into the fluid pressure accumulation bin 1 to accumulate the pressure through the fluid-inlet flow guiding cover 7, the fluid dust collection net 5, the flow guiding cover 4 for the fluid to flow into the fluid pressure accumulation bin, and the necking port 2 for the fluid to flow into the fluid pressure accumulation bin. Since the fluid flowing into the fluid pressure accumulation bin 1 is the gravity acceleration fluid, the fluid may rapidly form a pressure fluid in the fluid pressure accumulation bin 1. The pressure fluid in the fluid pressure accumulation bin 1 is sprayed to the turbine driving blades 9 by the nozzles 13 surrounding peripheries of the turbine driving blades for driving the fluid to flow into the necking port, so that a plurality of driven turbine driving blades 9 enable the turbine shaft 11 to rotate easily through a plurality of hidden levers formed by the turbine bracket 12 and a turbine shaft center. Meanwhile, part of resistance fluid flowing to the direction opposite to the moving of the bicycle along the front of the moving bicycle drives the turbine driving blades 9 by the turbine driving fluid sprayed through the external driving fluid filtering net 18, the external driving fluid flow inlet 17, the external driving fluid flow guiding cover 19 and the nozzles 20 for external driving fluid to flow out of the necking port, and also induce a plurality of turbine driving fluids sprayed by the spray nozzles 13 surrounding peripheries of the turbine driving blades for driving the fluid to flow into the necking port to be discharged from the fluid outlet 14 and to flow into an inner side of the fluid negative-pressure flow guiding cover 15. Another part of the resistance fluid flows to the direction opposite to the moving of the bicycle through exteriors of the fluid negative-pressure flow guiding cover 15 and the fluid negative-pressure outlet 16. A negative pressure-assisted air suction force is established outside the fluid negative-pressure outlet 16 by utilizing a flow velocity of the resistance fluid formed by a bicycle moving speed to promote the turbine driving fluid to be discharged from the interior of the fluid negative-pressure flow guiding cover 15 as soon as possible and increase working efficiency of a power machine, thereby forming the negative pressure air suction type fluid-driven power machine of the electric bicycle using solar photovoltaics and airflow to generate electricity.

The easily rotated turbine shaft 11 drives the electric generator 22 to generate electric energy. The electric energies generated by the electric generator 22 and the solar photovoltaic batteries 123 are combined with the electric energy of the storage battery 24 and then are transmitted to the driving motor 26 by the electric energy conversion apparatus 25, thereby forming a new auxiliary electric energy of the electric bicycle using solar photovoltaics and airflow to generate electricity. When the new electric energy generated in electricity generation by using solar photovoltaics and airflow can satisfy a working electric energy required by the driving motor 26 and the like, the electric energy conversion apparatus 25 can stop output of the electric energy of the storage battery 24 automatically. When the new electric energy generated in electricity generation by using solar photovoltaics and airflow exceeds the working electric energy required by the driving motor 26 and the like, the redundant electric energy charges the storage battery 24 through the electric energy conversion apparatus 25. When the driving motor 26 stops working and does not need the electric energy, the new electric energy generated in electricity generation by using solar photovoltaics and airflow is mainly used for charging the storage battery 24 through the electric energy conversion apparatus 25. When the electric bicycle does not move, under solar photovoltaic irradiation, the electric energy generated by the solar photovoltaic batteries 123 charges the storage battery 24 through the electric energy conversion apparatus 25.

In moving of the electric bicycle using solar photovoltaics and airflow to generate electricity, when the plurality of turbine driving fluids of the negative pressure air suction type fluid-driven power machine flow to a rear part of a running vehicle body through the turbine fluid outlet 14, the fluid negative-pressure flow guiding cover 15 and the fluid negative-pressure outlet 16, the part of fluids fill some fluids required by a negative pressure region formed by the fluids in the rear of the moving vehicle body, thereby alleviating some influences that vacuum generated in the rear of the moving vehicle body makes the vehicle body have a power to retreat backwards and reducing some moving resistance of the vehicle body. The pressure intensity of the turbine driving fluid is adjusted by the pressure reducing grooves 91 and the pressure boosting grooves 92 formed inside and outside the turbine driving blades.

When work of the negative pressure air suction type fluid-driven power machine needs to be stopped in the event of failure of the electric generator and the like, the fluid-inlet intercepting cover 8 and the external driving fluid-inlet intercepting cover 21 are opened, and the turbine driving fluid flow inlet of the negative pressure air suction type fluid-driven power machine is closed to stop the work of the negative pressure air suction type fluid-driven power machine.

Figure 3:
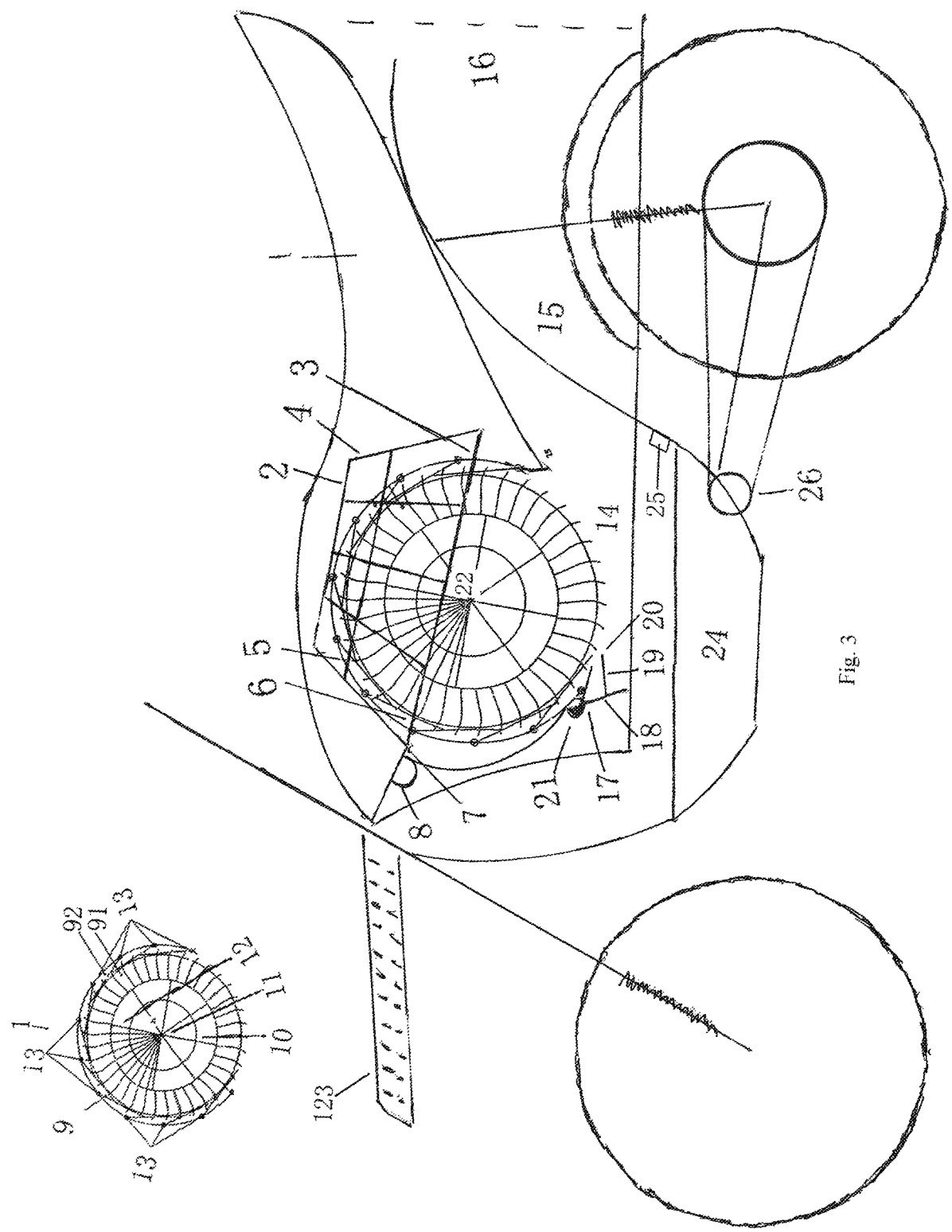
FIG. 3 is a schematic diagram of application of an electric motorcycle using solar photovoltaics and airflow to generate electricity.

3. Electric Motorcycle Using Solar Photovoltaics and Airflow to Generate Electricity As shown in FIG. 3 and FIG. 11, the electric motorcycle using solar photovoltaics and airflow to generate electricity is mainly composed of a fluid pressure accumulation bin 1, a necking port 2 for a fluid to flow into the fluid pressure accumulation bin, a flow inlet 3 for the fluid to flow into the fluid pressure accumulation bin, a flow guiding cover 4 for the fluid to flow into the fluid pressure accumulation bin, a fluid dust collection net 5, a fluid filtering net 6, a fluid-inlet flow guiding cover 7, a fluid-inlet intercepting cover 8, turbine driving blades 9, a turbine housing 10, a turbine shaft 11, a turbine bracket 12, nozzles 13 surrounding peripheries of the turbine driving blades for driving the fluid to flow into the necking port, a turbine fluid outlet 14, a fluid negative-pressure flow guiding cover 15, a fluid negative-pressure outlet 16, an external driving fluid inlet 17, an external driving fluid filtering net 18, an external driving fluid flow guiding cover 19, nozzles 20 for external driving fluid to flow out of the necking port, an external driving fluid-inlet intercepting cover 21, pressure reducing grooves 91 and pressure boosting grooves 92 formed inside and outside the turbine driving blades, an electric generator 22, solar photovoltaic batteries 123, a storage battery 24, an electric energy conversion apparatus 25, a driving motor 26 and the like.

When the electric motorcycle using solar photovoltaics and airflow to generate electricity is started initially, electric energies provided by the storage battery 24 and the solar photovoltaic batteries 123 are used for the work of the driving motor 26. With moving of a vehicle body and increasing of a moving speed, part of gravity acceleration fluid flowing to a direction opposite to the moving of the motorcycle along the bottom of a negative pressure air suction type fluid-driven power machine carried by the motorcycle flows into the fluid-inlet flow guiding cover 7 through the fluid filtering net 6 and the flow inlet 3 for the fluid to flow into the fluid pressure accumulation bin; and then the fluid flows into the fluid pressure accumulation bin 1 to accumulate the pressure through the fluid dust collection net 5, the flow guiding cover 4 for the fluid to flow into the fluid pressure accumulation bin, and the necking port 2 for the fluid to flow into the fluid pressure accumulation bin. Since the fluid flowing into the fluid pressure accumulation bin 1 is the gravity acceleration fluid, the fluid may rapidly form a pressure fluid in the fluid pressure accumulation bin 1. The pressure fluid in the fluid pressure accumulation bin 1 is sprayed to the turbine driving blades 9 by the nozzles 13 surrounding peripheries of the turbine driving blades for driving the fluid to flow into the necking port, so that a plurality of driven turbine driving blades 9 enable the turbine shaft 11 to rotate easily through a plurality of hidden levers formed by the turbine bracket 12 and a turbine shaft center. Meanwhile, part of resistance fluid flowing to the direction opposite to the moving of the motorcycle along the front of the moving motorcycle drives the turbine driving blades 9 by the turbine driving fluid sprayed through the external driving fluid filtering net 18, the external driving fluid inlet 17, the external driving fluid flow guiding cover 19 and the nozzles 20 for external driving fluid to flow out of the necking port, and also induce a plurality of turbine driving fluids sprayed by the nozzles 13 surrounding peripheries of the turbine driving blades for driving the fluid to flow into the necking port to be discharged from the fluid outlet 14 and to flow into an inner side of the fluid negative-pressure flow guiding cover 15. Another part of the resistance fluid flows to the direction opposite to the moving of the bicycle through exteriors of the fluid negative-pressure flow guiding cover 15 and the fluid negative-pressure outlet 16. A negative pressure-assisted air suction force is established outside the fluid negative-pressure outlet 16 by utilizing a flow velocity of the resistance fluid formed by a motorcycle moving speed to promote the turbine driving fluid to be discharged from the interior of the fluid negative-pressure flow guiding cover 15 as soon as possible, thereby forming the negative pressure air suction type fluid-driven power machine of the electric motorcycle using solar photovoltaics and airflow to generate electricity.

The easily rotated turbine shaft 11 drives the electric generator 22 to generate electric energy. The electric energy generated by the electric generator 22 is transmitted to the driving motor 26 by the electric energy conversion apparatus 25, thereby forming new auxiliary electric energy of the electric motorcycle using solar photovoltaics and airflow to generate electricity. When the new electric energy generated in electricity generation by using solar photovoltaics and airflow can satisfy a working electric energy required by the driving motor 26 and the like, the electric energy conversion apparatus 25 can stop output of the electric energy of the storage battery 24 automatically. When the new electric energy generated in electricity generation by using solar photovoltaics and airflow exceeds the working electric energy required by the driving motor 26 and the like, the redundant electric energy charges the storage battery 24 through the electric energy conversion apparatus 25. When the driving motor 26 stops working and does not need the electric energy, the new electric energy generated in electricity generation by using solar photovoltaics and airflow is mainly used for charging the storage battery 24 through the electric energy conversion apparatus 25. When the electric motorcycle does not move, under solar photovoltaic irradiation, the electric energy generated by the solar photovoltaic batteries 123 charges the storage battery 24 through the electric energy conversion apparatus 25.

In moving of the electric motorcycle using solar photovoltaics and airflow to generate electricity, when the plurality of turbine driving fluids of the negative pressure air suction type fluid-driven power machine flow to a rear part of a running vehicle body through the turbine fluid outlet 14, the fluid negative-pressure flow guiding cover 15 and the fluid negative-pressure outlet 16, the part of fluids fill some fluids required by a negative pressure region formed by the fluids in the rear of the moving vehicle body, thereby alleviating some influences that vacuum generated in the rear of the moving vehicle body makes the vehicle body have a power to retreat backwards and reducing some moving resistance of the vehicle body.

The pressure intensity of the turbine driving fluid is adjusted by the pressure reducing grooves 91 and the pressure boosting grooves 92 formed inside and outside the turbine driving blades 9.

When work of the negative pressure air suction type fluid-driven power machine needs to be stopped in the event of failure of the electric generator 22 and the like, the fluid-inlet intercepting cover 8 and the external driving fluid-inlet intercepting cover 21 are opened, and the turbine driving fluid flow inlet of the negative pressure air suction type fluid-driven power machine is closed to stop the work of the negative pressure air suction type fluid-driven power machine.

Since automobiles, ships and aircrafts have structures different from those of the bicycles and the like, the structure of the negative pressure air suction type fluid-driven power machine applied to the automobiles, the ships and the aircrafts will be changed, and is mainly composed of a fluid pressure accumulation bin, a flow guiding plate for fluid to flow into the fluid pressure accumulation bin, a fluid dust collection net, a fluid filtering net, a convective fluid-inlet flow guiding cover, a fluid-inlet intercepting cover, a converged fluid flow guiding apparatus, a converged fluid-inlet filtering net, turbine driving blades, a turbine housing, a turbine shaft, a turbine bracket, nozzles surrounding peripheries of the turbine driving blades for driving the fluid to flow into a necking port, a turbine fluid outlet, a fluid negative-pressure flow guiding cover, a fluid negative-pressure outlet, an external driving fluid flow inlet, an external driving fluid filtering net, an external driving fluid flow guiding cover, nozzles for external driving fluid to flow out of the necking port, a converged fluid-inlet intercepting cover, a filtering net for gravity acceleration fluid on a power machine bottom to flow in, an intercepting cover for gravity acceleration fluid on a power machine bottom to flow in, a converged fluid flow guiding apparatus comprising a converged fluid flow inlet, a converged fluid filtering net, a converged fluid flow guiding cover, pressure reducing grooves and pressure boosting grooves formed inside and outside the turbine driving blades and the like. An electric generator is mounted at a shaft center of the turbine shaft; and a flow guiding motor, a flow guiding propeller and the like are mounted on the automobiles, the ships and the aircrafts.

A plurality of modes can be adopted in specific embodiments.

For example, an electric vehicle (1) using solar photovoltaics and airflow to generate electricity is mainly composed of a fluid pressure accumulation bin 1, a flow guiding plate 102 for a fluid to flow into the fluid pressure accumulation bin, a fluid dust collection net 5, a fluid filtering net 6, a convective fluid-inlet flow guiding cover 105, a fluid-inlet intercepting cover 8, a converged fluid flow guiding apparatus 107, a converged fluid-inlet filtering net 108, turbine driving blades 9, a turbine housing 10, a turbine shaft 11, a turbine bracket 12, nozzles 13 surrounding peripheries of the turbine driving blades for driving the fluid to flow into a necking port, a turbine fluid outlet 14, a fluid negative-pressure flow guiding cover 15, a fluid negative-pressure outlet 16, an external driving fluid flow inlet 17, an external driving fluid filtering net 18, an external driving fluid flow guiding cover 19, nozzles 20 for an external driving fluid to flow out of the necking port, a converged fluid-inlet intercepting cover 121, a filtering net 122 for gravity acceleration fluid on a power machine bottom to flow in, an intercepting cover 223 for gravity acceleration fluid on a power machine bottom to flow in, a converged fluid flow guiding apparatus comprising a converged fluid flow guiding cover 25 and converged fluid flow inlets 124 on the front and both sides of a vehicle body, converged fluid-inlet filtering nets 108 and converged fluid-inlet flow guiding covers 125, as well as pressure reducing grooves 91 and pressure boosting grooves 92 formed inside and outside the turbine driving blades 9. An electric generator 22 is mounted at a shaft center of the turbine shaft. A flow guiding motor 27 and a flow guiding propeller 28 are mounted. Solar photovoltaic batteries 123, a storage battery 24, a secondary electric energy conversion apparatus 31, a secondary driving motor 32, a flow guiding plate 33 at a rear part of the vehicle body and the like are added.

Figure 4:
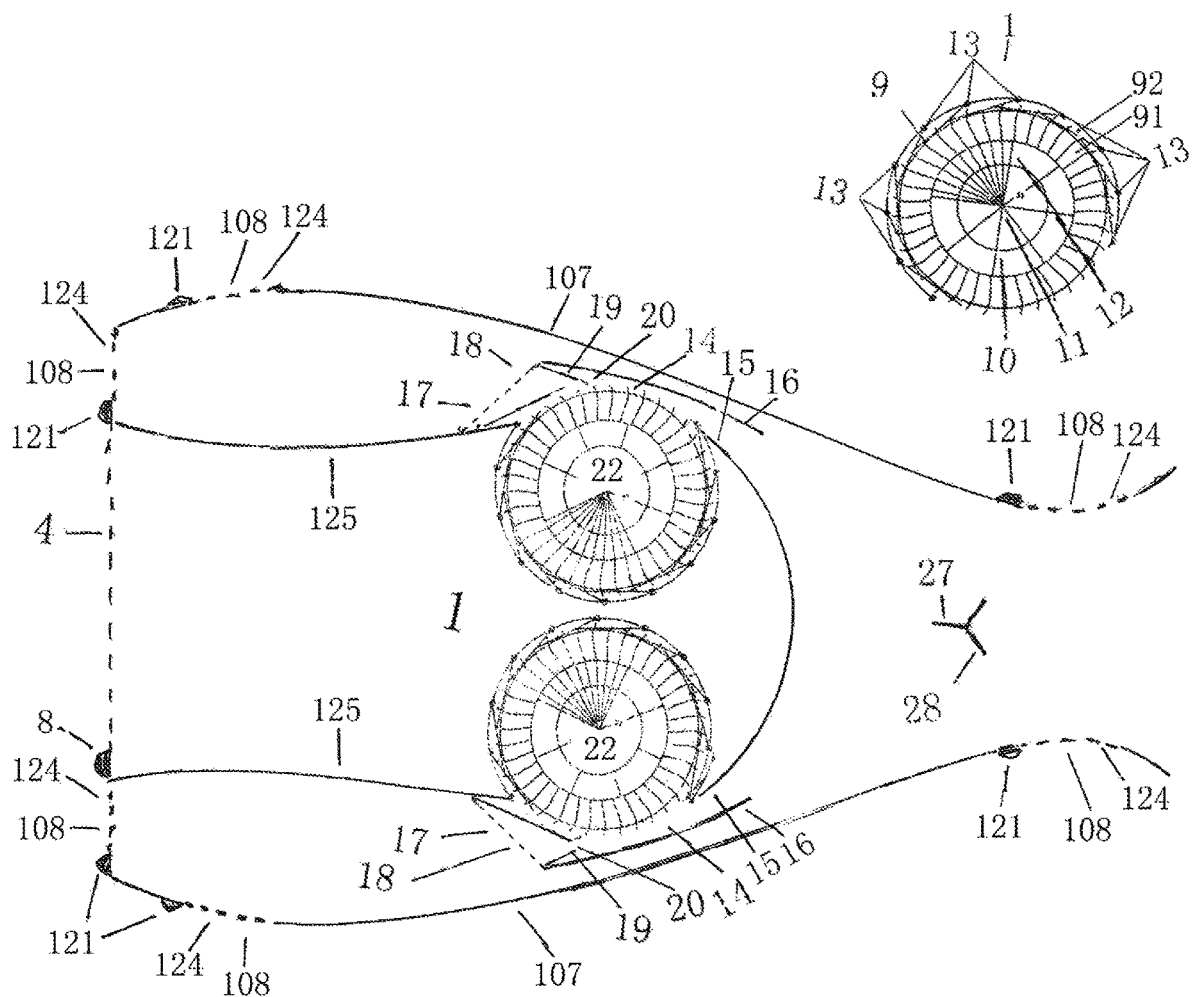
FIG. 4 is a schematic diagram 1 of application of an electric vehicle 1 using solar photovoltaics and airflow to generate electricity.
Figure 5:
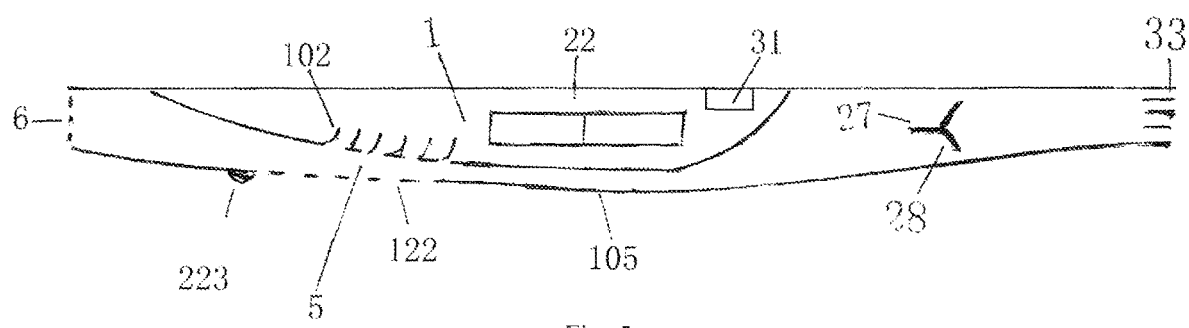
FIG. 5 is a schematic diagram 2 of application of an electric vehicle 1 using solar photovoltaics and airflow to generate electricity.
Figure 7:
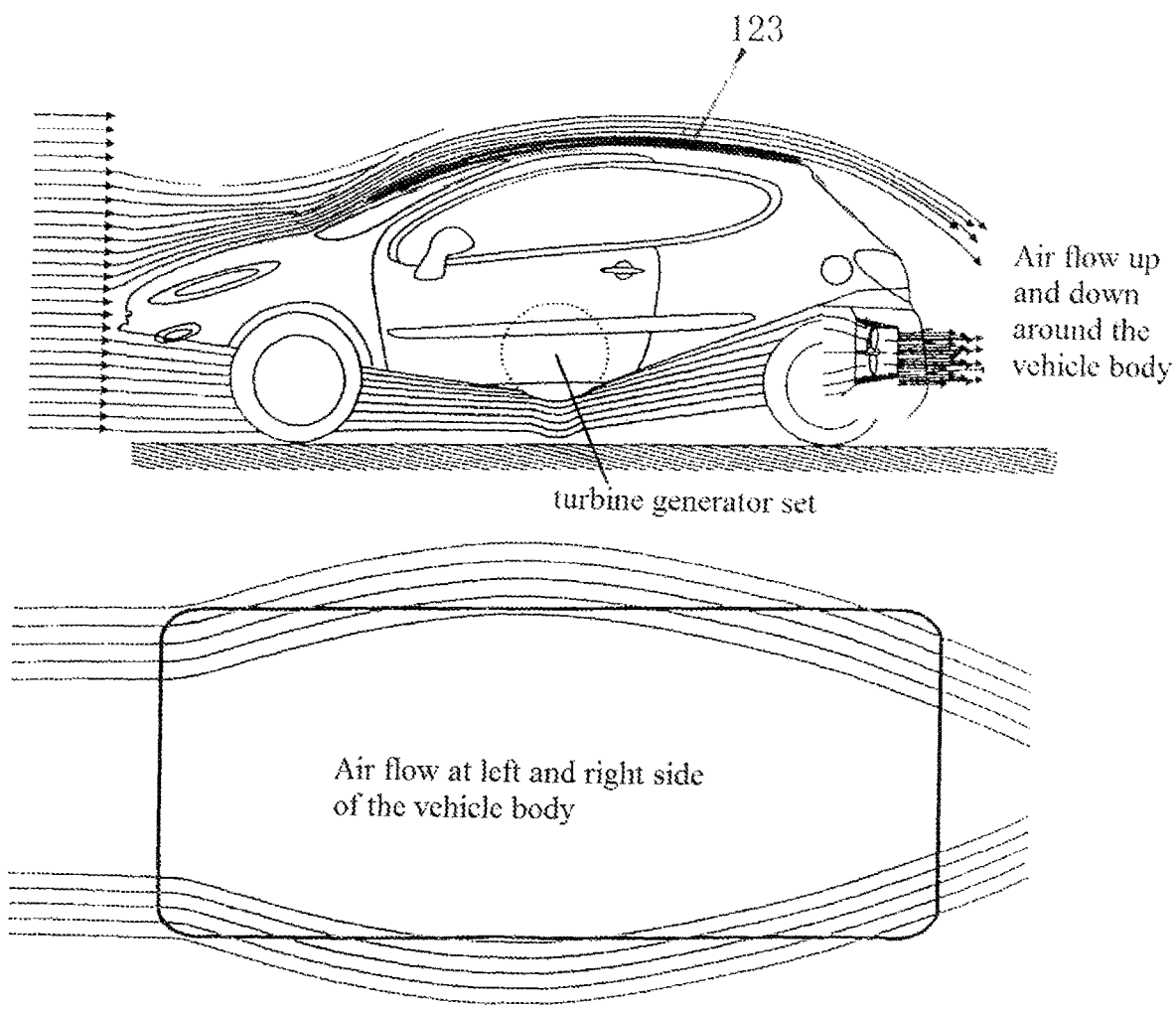
FIG. 7 is a schematic diagram of a fluid flowing path.

As shown in FIG. 4, FIG. 5, FIG. 7 and FIG. 12A, when the vehicle is driven to run by electric energy of the storage battery, part of fluid, obtained after part of gravity acceleration fluid flowing to a direction opposite to running of the vehicle along the bottom of the running vehicle flows through the filtering net 122 for gravity acceleration fluid on the power machine bottom to flow in and then flows into the convective fluid-inlet flow guiding cover 105 together with a part of resistance fluid in front of the running vehicle through the fluid filtering net 6, flows into the fluid pressure accumulation bin 1 (to accumulate the pressure) through the fluid dust collection net 5 and the flow guiding plate 102 for the fluid to flow into the fluid pressure accumulation bin. The pressure accumulation fluid flowing into the fluid pressure accumulation bin 1 drives the turbine driving blades 9 through the nozzles 13 surrounding peripheries of the turbine driving blades for driving the fluid to flow into the necking port. A plurality of driven turbine driving blades 9 enable the turbine shaft 11 to rotate easily via a plurality of hidden levers formed by the turbine bracket 12 and the turbine shaft 11. Part of fluid flowing into the convective fluid-inlet flow guiding cover 105 through the fluid filtering net 6 and the filtering net 22 for the gravity acceleration fluid on the power machine bottom to flow in flows to the flow guiding propeller 28. Under induction of the flow guiding propeller 28, a stagnation phenomenon when the fluid accumulates the pressure is reduced, and the flow rate of the fluid flowing into the fluid pressure accumulation bin 1 is increased. When a part of resistance fluid in the front of the running vehicle flows into the converged fluid flow guiding apparatus 107 through the converged fluid-inlet filtering net 108, a converged fluid is formed by continuously flowing subsequent fluids. Part of the fluid in the converged fluid drives the turbine driving blades 9 through the external driving fluid filtering net 18, the external driving fluid inlet 17, the external driving fluid flow guiding cover 19 and the nozzles 20 for an external driving fluid to flow out of the necking port. When driving the turbine driving blades 9, the external driving fluid induces the plurality of turbine driving fluids sprayed by the nozzles 13 surrounding peripheries of the turbine driving blades for driving the fluid to flow into the necking port to be discharged from the turbine fluid outlet 14 and to flow into the fluid negative-pressure flow guiding cover 15. Under induction of other fluids in the converged fluid flow guiding apparatus and the action of an air suction phenomenon of the fluids in the rear of the running vehicle body caused by a vehicle body running speed, the part of fluid rapidly flows to the direction opposite to the running of the vehicle body through the fluid negative-pressure flow guiding cover 15, the fluid negative-pressure outlet 16, the flow guiding propeller 28 and the opened flow guiding plate 33 at the rear part of the vehicle body. Thus, the fluid flowing to the direction opposite to the running of the vehicle body also resists part of negative-pressure resistance in a direction opposite to the running part of the vehicle body. In running of the vehicle, part of resistance fluid is guided by the converged fluid flow inlets 24 on the front part and both sides of the converged fluid flow guiding apparatus, the converged fluid-inlet filtering nets 108 and the converged fluid inlet flow guiding covers 25 (as shown in FIG. 4, FIG. 5 and FIG. 7), so that the fluids flowing to the direction opposite to the running of the vehicle along the periphery of the vehicle are further regularized to improve running stability and comfort of the vehicle.

Figure 6:
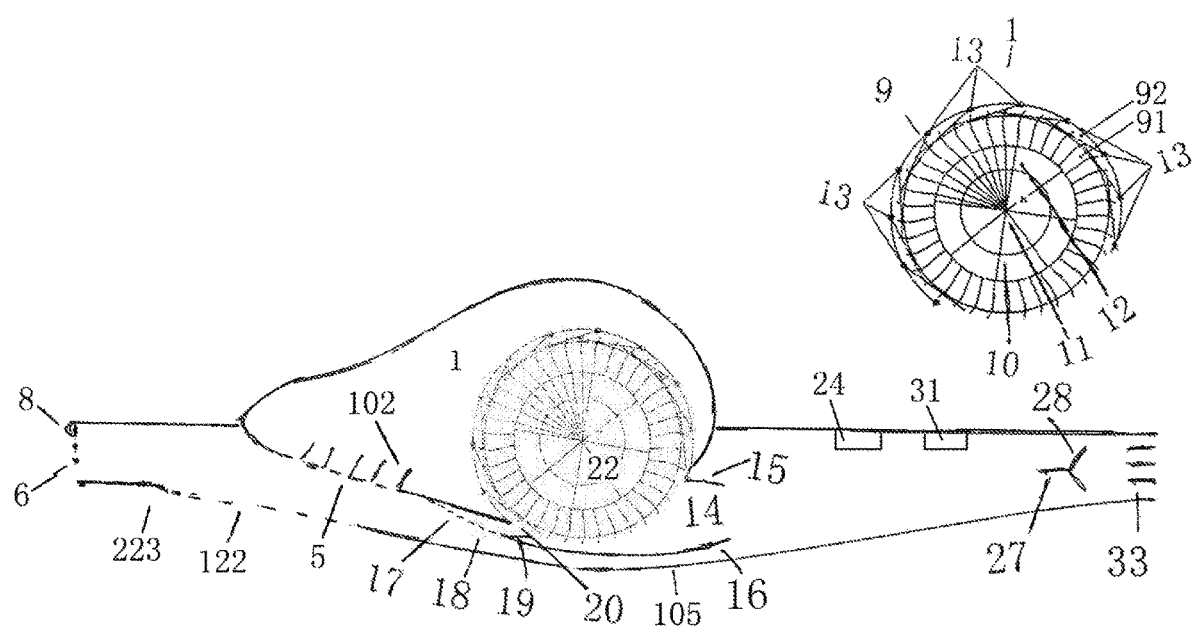
FIG. 6 is a schematic diagram of application of an electric vehicle 2 using solar photovoltaics and airflow to generate electricity.
Figure 12A:
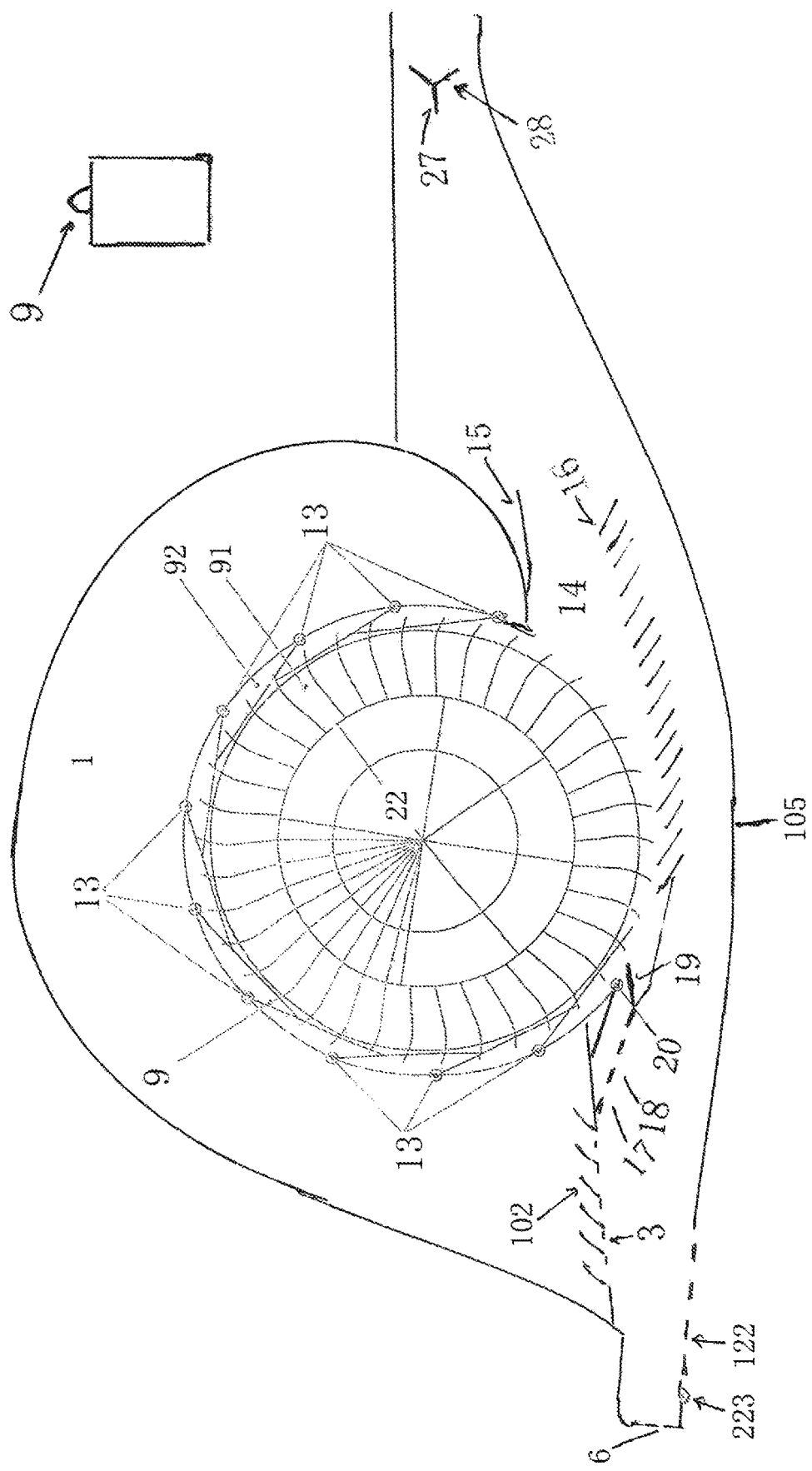
FIG. 12A is a structural schematic diagram of another negative pressure air suction type fluid-driven power machine.

For example, for an electric vehicle (2) using solar photovoltaics and airflow to generate electricity, the converged fluid flow guiding apparatus 107, the converged fluid-inlet filtering net 108 and the converged fluid-inlet intercepting cover 121 are canceled. The solar photovoltaic batteries 123, the storage battery 24, the secondary electric energy conversion apparatus 31, the secondary driving motor 32, the flow guiding plate 33 at the rear part of the vehicle body and the like are added. As shown in FIG. 6, FIG. 7 and FIG. 12A, when the vehicle is driven to run by electric energy of the storage battery 24, part of fluid, obtained after part of gravity acceleration fluid flowing to a direction opposite to running of the vehicle along the bottom of the vehicle flows through the filtering net 22 for the gravity acceleration fluid on the power machine bottom to flow in and then flows into the convective fluid-inlet flow guiding cover 105 together with a part of resistance fluid in front of the running vehicle through the fluid filtering net 6, flows into the fluid pressure accumulation bin 1 (to accumulate the pressure) through the fluid dust collection net 5 and the flow guiding plate 102 for the fluid to flow into the fluid pressure accumulation bin. The pressure accumulation fluid of the fluid pressure accumulation bin 1 drives the turbine driving blades 9 through the nozzles 13 surrounding peripheries of the turbine driving blades for driving the fluid to flow into the necking port. A plurality of driven turbine driving blades 9 enable the turbine shaft 11 to rotate easily via a plurality of hidden levers formed by the turbine bracket 12 and the turbine shaft 11. Part of fluid flowing into the convective fluid-inlet flow guiding cover 105 through the fluid filtering net 6 and the filtering net 22 for the gravity acceleration fluid on the power machine bottom to flow in flows to the flow guiding propeller 28. Under induction of the flow guiding propeller 28, a stagnation phenomenon when the fluid accumulates the pressure is reduced, and the flow rate of the fluid to flow into the fluid pressure accumulation bin 1 is increased. The part of fluid flowing into the convective fluid-inlet flow guiding cover 105 through the fluid filtering net 4 and the filtering net 22 for the gravity acceleration fluid on the power machine bottom to flow in drives the turbine driving blades 9 through the convective fluid-inlet flow guiding cover 105, the external driving fluid filtering net 18, the external driving fluid flow inlet 17, the external driving fluid flow guiding cover 19 and the nozzles 20 for the external driving fluid to flow out of the necking port. When driving the turbine driving blades 9, the external driving fluid induces the plurality of turbine driving fluids sprayed by the nozzles 13 surrounding peripheries of the turbine driving blades for driving the fluid to flow into the necking port to be discharged from the turbine fluid outlet 14 and to flow into the fluid negative-pressure flow guiding cover 15. Under the action of an air suction phenomenon of the fluids in the rear of the running vehicle body caused by a running speed of the vehicle body, the turbine driving fluids rapidly flow to the direction opposite to the running of the vehicle body through the fluid negative-pressure flow guiding cover 15, the fluid negative-pressure outlet 16, the flow guiding propeller 28 and the opened flow guiding plate 33 at the rear part of the vehicle body. Thus, the fluid flowing to the direction opposite to the running of the vehicle body also resists part of negative-pressure resistance in a direction opposite to the running of the vehicle body.

A driving pressure intensity of the turbine driving fluids is adjusted by the pressure reducing grooves and the pressure boosting grooves formed inside and outside the turbine driving blades.

The rotating turbine shaft 11 drives the electric generator 22 to generate electricity. The electric energy generated by the electric generator 22 drives the secondary vehicle driving motor 32 and the like to work in combination with the electric energy generated by the solar photovoltaic batteries 123 and the electric energy of the storage battery 24 under guidance of the secondary electric energy conversion apparatus 31. When the electric energies generated by the electric generator 22 and the solar photovoltaic batteries 123 reach or exceed a working electric energy required by the secondary vehicle driving motor 32 and the like, the electric energies generated by the electric generator 22 and the solar photovoltaic batteries 123 supply the working electric energy required by the secondary vehicle driving motor 32 and the like and also can charge the storage battery 24.

When the vehicle needs to stop for a short time, under guidance of a semi-opened flow guiding plate 33 at the rear part of the vehicle body, the flow guiding propeller 28 assists a negative pressure air suction type fluid-driven power machine to work. When the vehicle is stopped, the solar photovoltaic batteries 123 can charge the storage battery 24 under photovoltaic irradiation.

When the electric generator has a failure or the negative pressure air suction type fluid-driven power machine cannot work, the fluid-inlet intercepting cover 8 is opened; the converged fluid-inlet intercepting cover 121 is opened; and the intercepting cover 223 for the gravity acceleration fluid on the power machine bottom to flow in is opened, to cut off sources of the turbine driving fluids. Meanwhile, the flow guiding motor 27 is closed to stop work of the flow guiding propeller 28.

Because the ships and aircrafts belong to floating bodies, they can cite a working mode of the negative pressure air suction type fluid-driven power machine applied to the electric vehicle (2) using solar photovoltaics and airflow to generate electricity, and are mainly composed of the fluid pressure accumulation bin 1, the flow guiding plate 102 for the fluid to flow into the fluid pressure accumulation bin, the fluid dust collection net 5, the fluid filtering net 6, the convective fluid-inlet flow guiding cover 105, the fluid-inlet intercepting cover 8, the turbine driving blades 9, the turbine housing 10, the turbine shaft 11, the turbine bracket 12, the nozzles 13 surrounding peripheries of the turbine driving blades for driving the fluid to flow into the necking port, the turbine fluid outlet 14, the fluid negative-pressure flow guiding cover 15, the fluid negative-pressure outlet 16, the external driving fluid flow inlet 17, the external driving fluid filtering net 18, the external driving fluid flow guiding cover 19, the nozzles 20 for the external driving fluid to flow out of the necking port, as well as the pressure reducing grooves and the pressure boosting grooves formed inside and outside the turbine driving blades, and the like. An electric generator 22 can be mounted at a shaft center of the turbine shaft. The flow guiding motor 27, the flow guiding propeller 28, the solar photovoltaic batteries 123, the storage battery 24 and the secondary electric energy conversion apparatus 31 are added. The converged fluid flow guiding apparatus 107, the converged fluid-inlet filtering net 108, the converged fluid-inlet intercepting cover 121 and the like are canceled.

Figure 8:
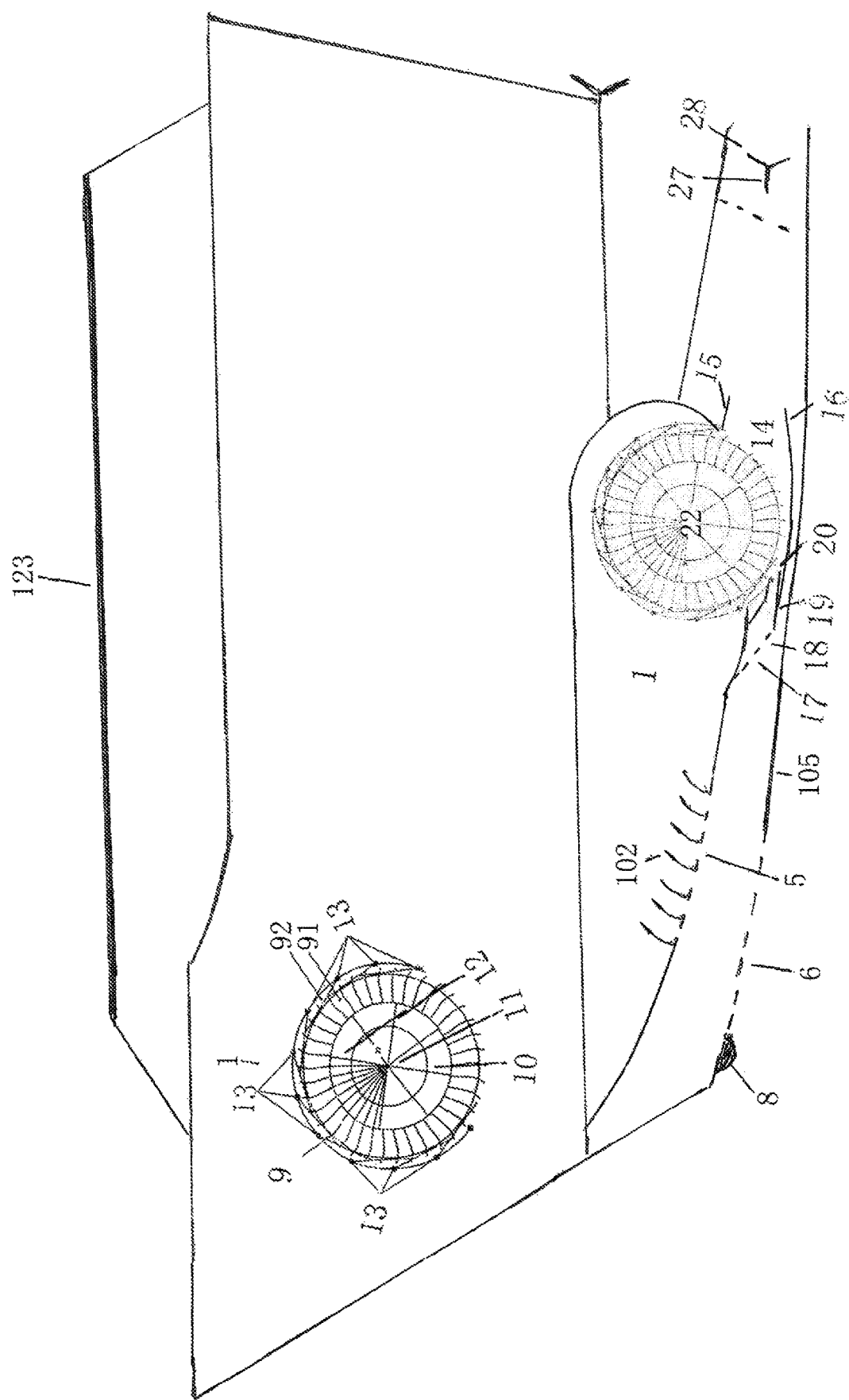
FIG. 8 is a schematic diagram of application of a ship using solar photovoltaics and fluids to generate electricity.
Figure 12B:
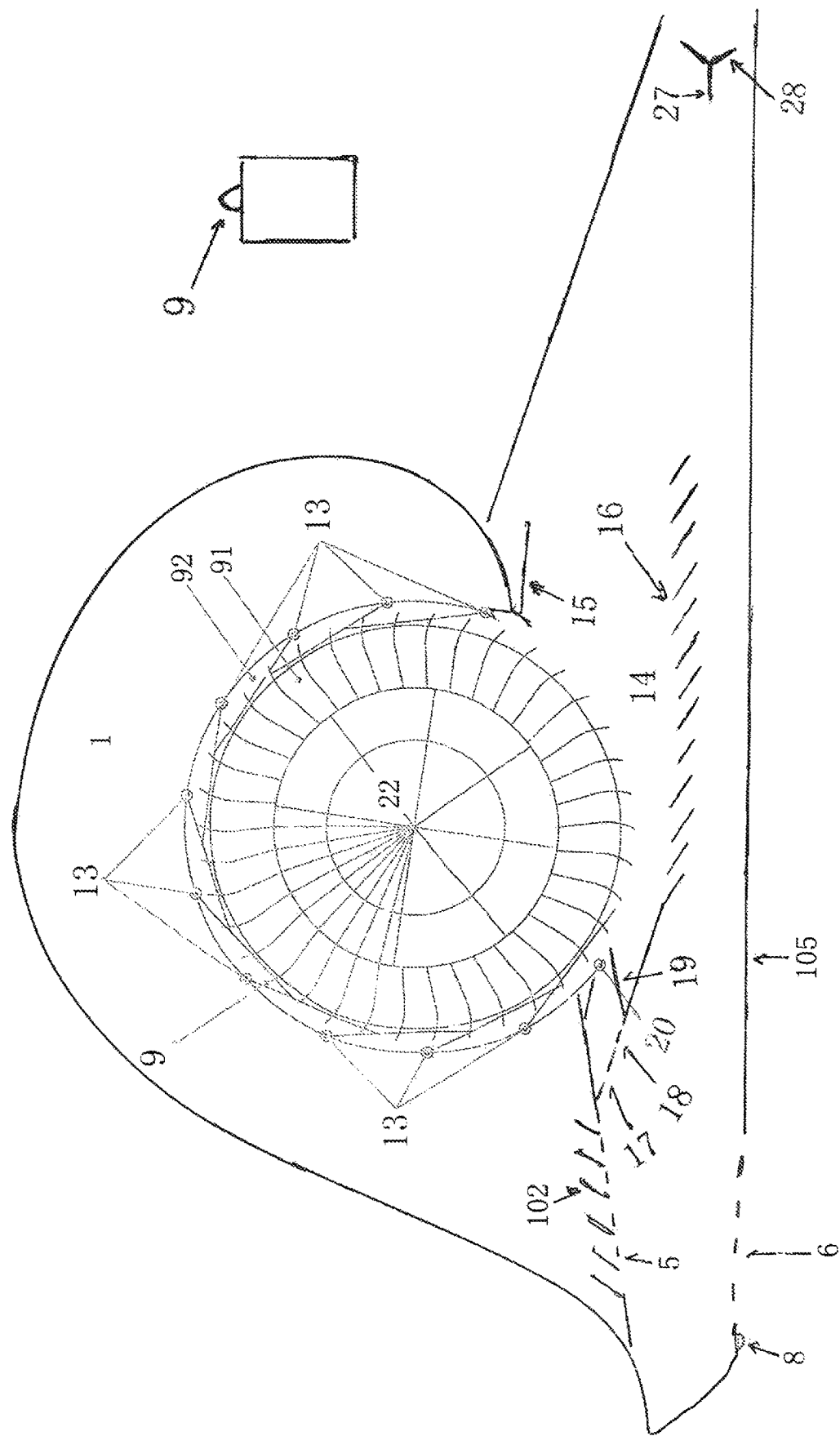
FIG. 12B is a structural schematic diagram of still another negative pressure air suction type fluid-driven power machine.

As shown in FIG. 8 and FIG. 12B, for a ship using solar photovoltaics and airflow to generate electricity, in sailing of the ship, part of gravity acceleration fluid flowing to a direction opposite to the sailing of the ship along the bottom of the negative pressure air suction type fluid-driven power machine carried by the ship flows into the fluid pressure accumulation bin 1 (to accumulate the pressure) through the fluid filtering net 6, the convective fluid-inlet flow guiding cover 105, the fluid dust collection net 5 and the flow guiding plate 102 for the fluid to flow into the fluid pressure accumulation bin. The pressure accumulation fluid of the fluid pressure accumulation bin 1 drives the turbine driving blades 9 through the nozzles 13 surrounding peripheries of the turbine driving blades for driving the fluid to flow into the necking port. The driven turbine driving blades 9 enable the turbine shaft 11 to rotate easily via a plurality of hidden levers formed by the turbine bracket 12 and the turbine shaft 11. Under induction of the flow guiding propeller 28, the fluid in the part of gravity acceleration fluid flowing to the flow guiding propeller 28 through the fluid filtering net 6 and the convective fluid-inlet flow guiding cover 105 reduces the stagnation phenomenon when the fluid accumulates the pressure, and increases the flow rate of the fluid flowing into the fluid pressure accumulation bin 1. Part of gravity acceleration fluid drives the turbine driving blades 9 through the fluid filtering net 4, the convective fluid-inlet flow guiding cover 5, the external driving fluid-inlet filtering net 18 (reference numerals are inconsistent), the external driving fluid flow inlet 17, the external driving fluid flow guiding cover 19 and the nozzles 20 for the external driving fluid flowing out of the necking port. When driving the turbine driving blades 9, the external driving fluid induces the plurality of turbine driving fluids sprayed by the nozzles 13 surrounding peripheries of the turbine driving blades for driving the fluid to flow into the necking port to be discharged from the turbine fluid outlet 14 and to flow into the fluid negative-pressure flow guiding cover 15. Under the action of the air suction phenomenon of the fluids in the rear of the sailing ship caused by a ship sailing speed, the turbine driving fluids rapidly flow to the direction opposite to the sailing of the ship through the fluid negative-pressure flow guiding cover 15, the fluid negative-pressure outlet 16 and the flow guiding propeller 28. Thus, the fluid flowing to the direction opposite to the sailing of the ship also resists part of negative-pressure resistance in a direction opposite to the sailing of the ship, to assist to increase a thrust force of the ship to propel a propeller.

Figure 9:
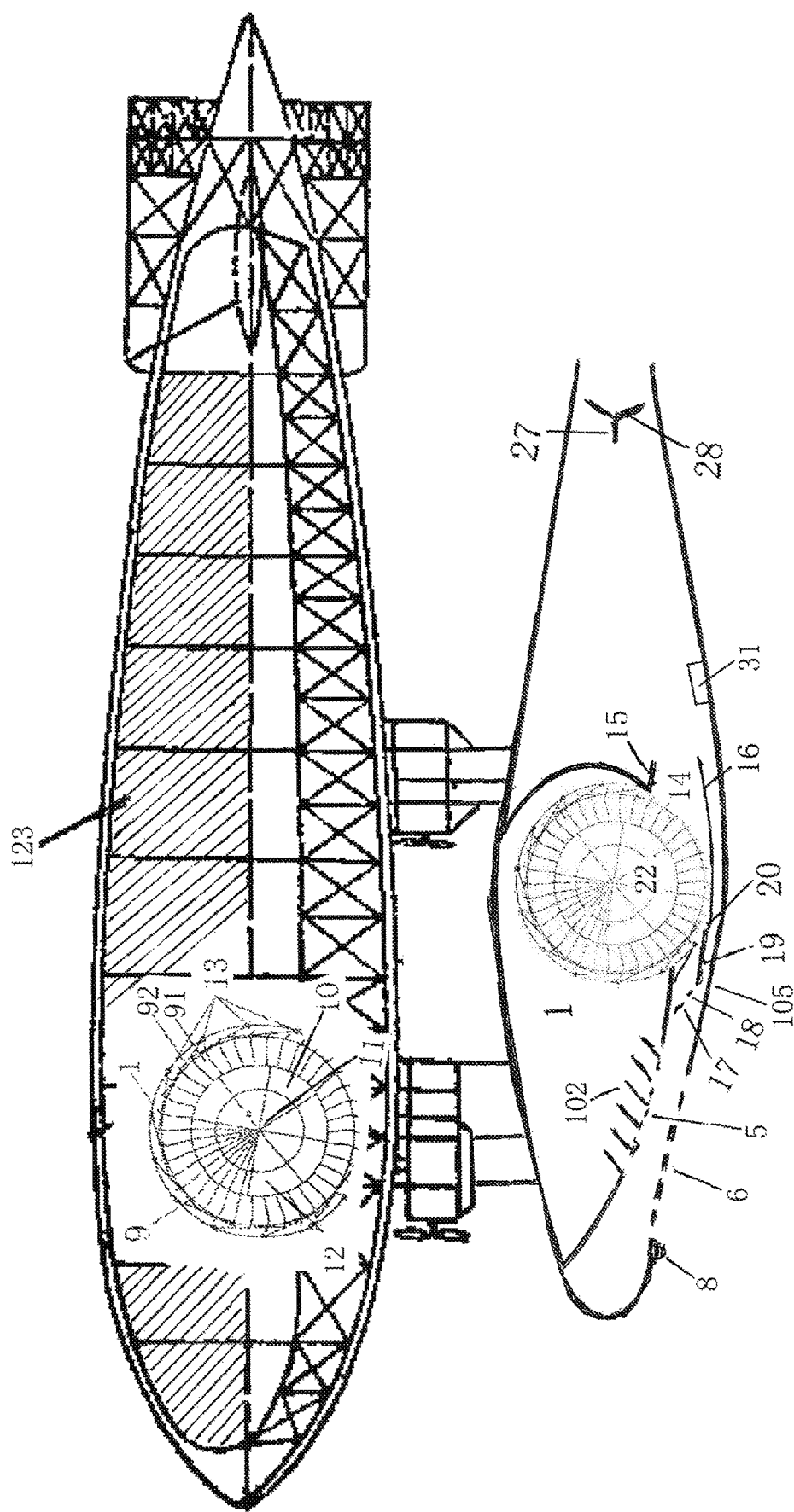
FIG. 9 is a schematic diagram of application of an aircraft using solar photovoltaics and airflow to generate electricity.

As shown in FIG. 9 and FIG. 12B, for an aircraft using solar photovoltaics and airflow to generate electricity, in flying of the ship, part of gravity acceleration fluid flowing to a direction opposite to the flying of the aircraft along the bottom of the negative pressure air suction type fluid-driven power machine carried by the aircraft flows into the fluid pressure accumulation bin 1 (to accumulate the pressure) through the fluid filtering net 6, the convective fluid-inlet flow guiding cover 105, the fluid dust collection net 5 and the flow guiding plate 102 for the fluid to flow into the fluid pressure accumulation bin. The pressure accumulation fluid of the fluid pressure accumulation bin 1 drives the turbine driving blades 9 through the nozzles 13 surrounding peripheries of the turbine driving blades for driving the fluid to flow into the necking port. The driven turbine driving blades 9 enable the turbine shaft 11 to rotate easily via a plurality of hidden levers formed by the turbine bracket 12 and the turbine shaft 11. Under induction of the flow guiding propeller 28, the fluid in part of resistance fluid flowing to the flow guiding propeller 28 through the fluid filtering net 6 and the convective fluid-inlet flow guiding cover 105 reduces the air stagnation phenomenon when the fluid accumulates the pressure, and increases the flow of the fluid flowing into the fluid pressure accumulation bin 1. Part of gravity acceleration fluid drives the turbine driving blades 9 through the fluid filtering net 6, the convective fluid-inlet flow guiding cover 105, the external driving fluid-inlet filtering net 18, the external driving fluid flow inlet 17, the external driving fluid flow guiding cover 19 and the nozzles 20 for the external driving fluid to flow out of the necking port. When driving the turbine driving blades 9, the external driving fluid induces the plurality of turbine driving fluids sprayed by the nozzles 13 surrounding peripheries of the turbine driving blades for driving the fluid to flow into the necking port to be discharged from the turbine fluid outlet 14 and to flow into the fluid negative-pressure flow guiding cover 15. Under the action of the air suction phenomenon of the fluids in the rear of the flying aircraft caused by an aircraft flying speed, the turbine driving fluids rapidly flow to the direction opposite to the flying of the aircraft through the fluid negative-pressure flow guiding cover 15, the fluid negative-pressure outlet 16 and the flow guiding propeller 28. Thus, the fluid flowing to the direction opposite to the flying of the aircraft also resists part of negative-pressure resistance in a direction opposite to the flying of the aircraft, to assist to increase a thrust force of the aircraft to propel a propeller.

The driving pressure intensity of the turbine driving fluids is adjusted by the pressure reducing grooves and the pressure boosting grooves formed inside and outside the turbine driving blades.

The rotating turbine shaft 11 drives the electric generator 22 to generate electricity. The electric energy generated by the electric generator 22 provides a working electric energy required by the ship or the aircraft together with the electric energy generated by the solar photovoltaic batteries 123 under guidance of the secondary electric energy conversion apparatus 31. When the ship and the aircraft are stopped, the solar photovoltaic batteries 123 can charge the storage battery 24 under photovoltaic irradiation.

When the electric generator has a failure or the negative pressure air suction type fluid-driven power machine cannot work, the fluid inlet intercepting cover 8 is opened to cut off a source of the turbine driving fluids and to stop work of the negative pressure air suction type fluid-driven power machine. Meanwhile, the flow guiding motor 27 is closed to stop work of the flow guiding propeller 28.

A negative pressure air suction type fluid-driven power machine applied to a wheel-rail train is different from the negative pressure air suction type fluid-driven power machine applied to the bicycle in structure, and is mainly composed of a fluid pressure accumulation bin 1, a pressure accumulation fluid flow guiding plate 202, a fluid guiding plate 203, a fluid filtering net 6, a fluid dust collection net 5, converged fluid flow guiding louvers 206, a converged fluid and vehicle body bottom fluid separation plate 207, converged fluid and turbine driving fluid convection louvers 208, turbine driving blades 9, a turbine housing 10, a turbine shaft 11, a turbine bracket 12, nozzles 13 surrounding peripheries of the turbine driving blades for driving the fluid to flow into a necking port, a flow guiding apparatus 214 surrounding peripheries of the turbine driving blades for driving the fluid to flow, a turbine fluid outlet 14, a fluid negative-pressure flow guiding cover 15, an external driving fluid flow inlet 17, an external driving fluid filtering net 18, an external driving fluid flow guiding cover 19, nozzles 20 for an external driving fluid to flow out of the necking port, an external driving fluid-inlet intercepting cover 21, as well as pressure reducing grooves 91 and pressure boosting grooves 92 formed inside and outside the turbine driving blades 9. An electric generator 22 is mounted at a shaft center of the turbine shaft.

The negative pressure air suction type fluid-driven power machine is integrated with the vehicle body, a ship body and the like, so it is also integrated with a train body when applied to the wheel-rail train. The particularity of the wheel-rail train has resulted in a main driving power source of the negative pressure air suction type fluid-driven power machine at a runtime of the wheel-rail train. The gravity acceleration fluid generated by the fluid flowing in a direction opposite to running of the wheel-rail train along the bottom of the wheel-rail train should not break stability, safety and comfort of the wheel-rail train and the running controllability of a wheel-rail train driver for the train because of increasing a buoyancy force of the gravity acceleration fluid. Thus, the wheel-rail train needs a relatively ideal streamline-supported induction method, and a streamline-supported wheel-rail train which can be applied together with the negative pressure air suction type fluid-driven power machine is generated.

Such a wheel-rail train mainly comprises an inducing vehicle body 323. A front flow guiding wing 324 and a rear flow guiding wing 325 are respectively mounted on a front vehicle body and a rear vehicle body. A fluid mutual-suction port 326 and a fluid mutual-suction port cover 327 are arranged on a side surface of the inducing vehicle body connected with a middle part to a rear part of the front flow guiding wing 324). A wing flap 328 is mounted on a rear side of the front flow guiding wing 324. A wing flap baffle 29 is arranged at a connected part between the wing flap 328 and the side surface of the inducing vehicle body. A fluid flow outlet 30 connected with the fluid mutual-suction port 326 is formed in the bottom of the front vehicle body. Bent compression wings 31 are arranged on both sides of the top of the inducing vehicle body. A central dividing line 32 is arranged at the top of the inducing vehicle body. A fluid velocity detection apparatus 333 is arranged at the middle of the train. A cross-sectional area 34 of the middle of a train inducing vehicle is greater than cross-sectional areas 35 of both ends. A fluid mutual-suction port 326 and a fluid mutual-suction port cover 37 are arranged on a side surface of the inducing vehicle body connected with a middle part to a rear part of the rear flow guiding wing 325 of the rear vehicle body of the train. A rear wing flap 38 is arranged on a front part of the rear flow guiding wing 325. A wing flap baffle 39 is arranged at a connected part between the rear wing flap 38 and the side surface of the inducing vehicle body. Auxiliary propeller groups 40 are mounted at the middle of the front flow guiding wing 324 and the side surface of the inducing vehicle body 323. Auxiliary propeller groups (41) are mounted at the middle of the rear flow guiding wing 325 and the side surface of the inducing vehicle body 323. A fluid flow outlet (42) connected with the fluid mutual-suction port 326 is formed in the bottom of the rear vehicle body. A pressure accumulation fluid flow guiding plate 202, a fluid guiding plate 203 and a fluid filtering net 6 are arranged at the bottom of the inducing vehicle body. Converged fluid flow guiding louvers 206, converged fluid and vehicle body bottom fluid separation plates 207, converged fluid flow guiding division plates 43, automatic-adjustment apparatuses 44 of converged fluid flow guiding louver and automatic-adjustment apparatuses 45 of converged fluid flow guiding division plate are arranged on lower parts of both sides of the inducing vehicle body. A fluid pressure accumulation bin 1 and converged fluid and turbine driving fluid convection louvers 208 are arranged at the bottom of the train inducing vehicle. In order to improve a train braking and decelerating effect at the time of emergency braking during running of the train, partially hidden wind-resistance brake plates are mounted on lower middle parts of both sides of the train inducing vehicle body; and pressure accumulation bin decompression louvers 4 and the like are arranged beside the converged fluid and turbine driving fluid convection louvers 8 of the train vehicle.

Before the train runs, specified orientations of the converged fluid flow guiding louvers 206, the converged fluid flow guiding division plates 43, and the converged fluid and turbine driving fluid convection louvers are adjusted according to a train running direction as shown in FIG. 13 (C, D, E, F, G). The fluid mutual-suction port cover 327 of the front vehicle body is canceled. The fluid mutual-suction port 326 in the side surface of the front flow guiding vehicle body 323 is opened. A rear part of the wing flap 328 slightly swings upwards. A rear side of the wing flap baffle 29 slightly moves outwards to an outer side of a bottom center line direction of the train. The rear part of the converged fluid flow guiding division plate 43 of the front vehicle body 323 slightly moves inwards to the bottom center line direction of the train (as shown in FIG. 13D). The front part of the converged fluid flow guiding division plate 43 on the front part of the train inducing vehicle slightly moves outwards. The rear part of the converged fluid flow guiding division plate 43 on the rear part of the vehicle slightly moves inwards to the bottom center line direction of the train. The rear part of the converged fluid flow guiding division plate 43 on the rear part of the train inducing vehicle connected with the rear vehicle body slightly moves outwards. The converged fluid flow guiding louvers 206 and the converged fluid and turbine driving fluid convection louvers 208 are adjusted to the specified orientations. The fluid pressure accumulation bin decompression louvers 46 are closed. Meanwhile, a corresponding external driving fluid flow inlet 17 is opened, an external driving fluid flow inlet 17 in an opposite direction is closed, and the driving fluid of a corresponding flow guiding apparatus 214 surrounding peripheries of the turbine driving blades for driving the fluid to flow is opened to guide (as shown in FIG. 13A and FIG. 13E). Part of the fluid mutual-suction port 326 is closed by the fluid mutual-suction port cover 37 of the rear vehicle body of the train. The front part of the rear wing flap 38 slightly swings downwards. A front edge of the wing flap baffle 39 slightly moves inwards to the bottom center line direction of the train. The front part of the converged fluid flow guiding division plate 43 of the rear vehicle body slightly moves inwards to the bottom center line direction of the train (as shown in FIG. 13F).

In the running of the wheel-rail train, part of wheel-rail train running resistance fluid on the front part (front side) of the wheel-rail train flows to upper and lower flow guiding surfaces of the wing flap 328 along upper and lower flow guiding surfaces of the flow guiding wing 324. The fluid flowing through the upper flow guiding surface of the flow guiding wing 324 is pushed and pressed by the subsequent airflow and extruded by the side surface of the inducing vehicle body 323 to form a converged fluid. When flowing through the outer side of the fluid mutual-suction port 326 formed in the side surface of the inducing vehicle body, the part of fluid may produce a mutual suction phenomenon (fluid mutual-suction phenomenon) together with a gravity acceleration fluid flowing to a direction opposite to the running of the train outside the fluid flow outlet 30 in the bottom of the vehicle body. Through the fluid mutual-suction phenomenon, the train running speed, the atmospheric pressure, the gravity and the like, the part of fluid successfully forms the fluid which is bent over an arc surface on the flow guiding wing 324 and flows to an upper part of the wing flap 328. Through the fluid mutual-suction phenomenon, part of the gravity acceleration fluid flowing to the direction opposite to the running of the train along the bottom of the front vehicle body 323 is sucked out by the converged fluid through the pressure accumulation fluid flow guiding plate 202, the fluid guiding plate 203, the fluid filtering net 6, the fluid flow outlet 30 and the fluid mutual-suction port 326. The rear part of the wing flap 328 slightly swings upwards and the rear side of the wing flap baffle 29 slightly moves outwards, so the fluids flowing away from the wing flap 328 and the wing flap baffle 29 can form the converged fluid flowing to the inclined top and the inclined outside of the running train. In fact, at a moment that the part of fluid flows away from the wing flap 328 and the wing flap baffle 29, due to a fluid pressure difference phenomenon appearing on the upper and lower flow guiding surfaces of the wing flap 328 and inner and outer sides of the wing flap baffle 29, the mutual suction phenomenon (fluid mutual-suction phenomenon) of the fluids is generated between the fluids flowing to the direction opposite to the running of the train through the upper and lower flow guiding surfaces of the wing flap 328 and inner and outer flow guiding surfaces of the wing flap baffle 29. Under the combined action of the fluid mutual-suction phenomenon, the train running speed, the atmospheric pressure, the gravity and the like, the part of converged fluid may change the flowing direction rapidly to form a converged fluid flowing to the direction opposite to the running of the train in an approximately horizontal mode along the bottoms of the both sides of the train. The part of converged fluid, guided by the converged fluid flow guiding apparatus composed of the converged fluid flow guiding louvers 206, the converged fluid and vehicle body bottom fluid separation plates 207 and the converged fluid flow guiding division plates 43 on the rear part of the front vehicle body, passes over a connected part between vehicles, and flows to the inner and outer sides of the converged fluid flow guiding apparatus composed of the converged fluid flow guiding louvers 206, the converged fluid and vehicle body bottom fluid separation plates 207 and the converged fluid flow guiding division plates 43 of an adjacent vehicle. When the converged fluid flows through the connected part between the vehicles, due to the mutual suction phenomenon between the converged fluid and the fluid flowing to the direction opposite to the running of the train along the bottom of the connected part between the vehicles, the air suction force of the converged fluid is further increased, so that the fluid flowing through the upper part of the converged fluid and flowing to the direction opposite to the running of the train is absorbed by the converged fluid to form a fluid which is obliquely bent downwards to protect a train running gravity center. Then, under guidance of the converged fluid flow guiding apparatus composed of the converged fluid flow guiding louvers 206, the converged fluid and vehicle body bottom fluid separation plates 207 and the converged fluid flow guiding division plates 43 of the adjacent vehicle, the converged fluid flowing to the direction opposite to the running of the train along the inner and outer sides of the converged fluid flow guiding apparatus composed of the converged fluid flow guiding louvers 206, the converged fluid and vehicle body bottom fluid separation plates 207 and the converged fluid and turbine driving fluid convection louvers 208 at the middle of the train vehicle also forces part of fluid flowing to the direction opposite to the running of the train on the outer sides and the upper parts of the converged fluid flow guiding louvers 206 to flow to the converged fluid, so that the fluid flowing to the direction opposite to the running of the train along the upper part of the vehicle body of the train is absorbed by the converged fluid to form the fluid which is bent and pressed to protect the train running gravity center.

Figure 13A:
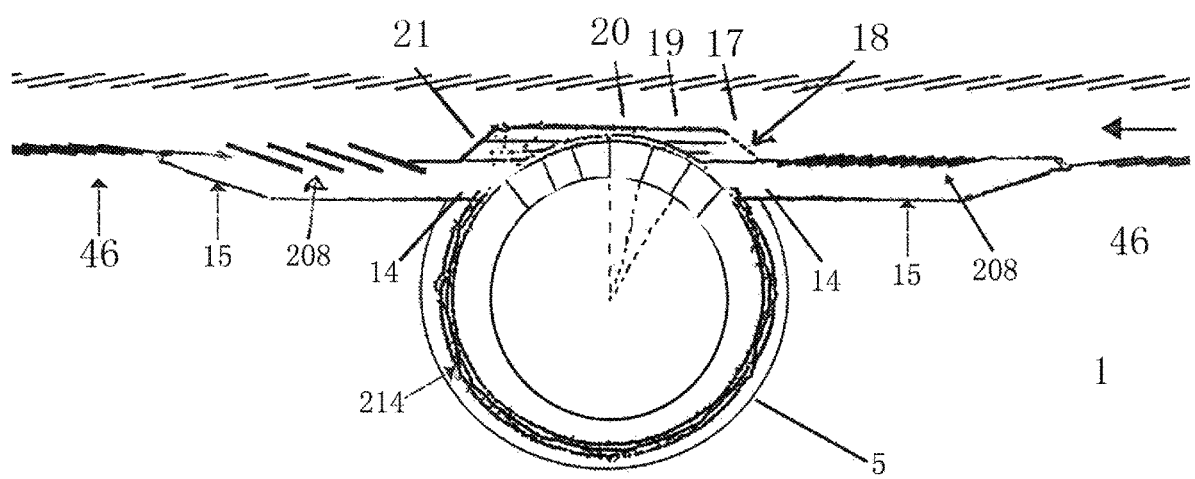
FIG. 13A is a schematic diagram of application of a single-group double-direction negative pressure air suction type fluid-driven power machine applied to a wheel-rail train.
Figure 13B:
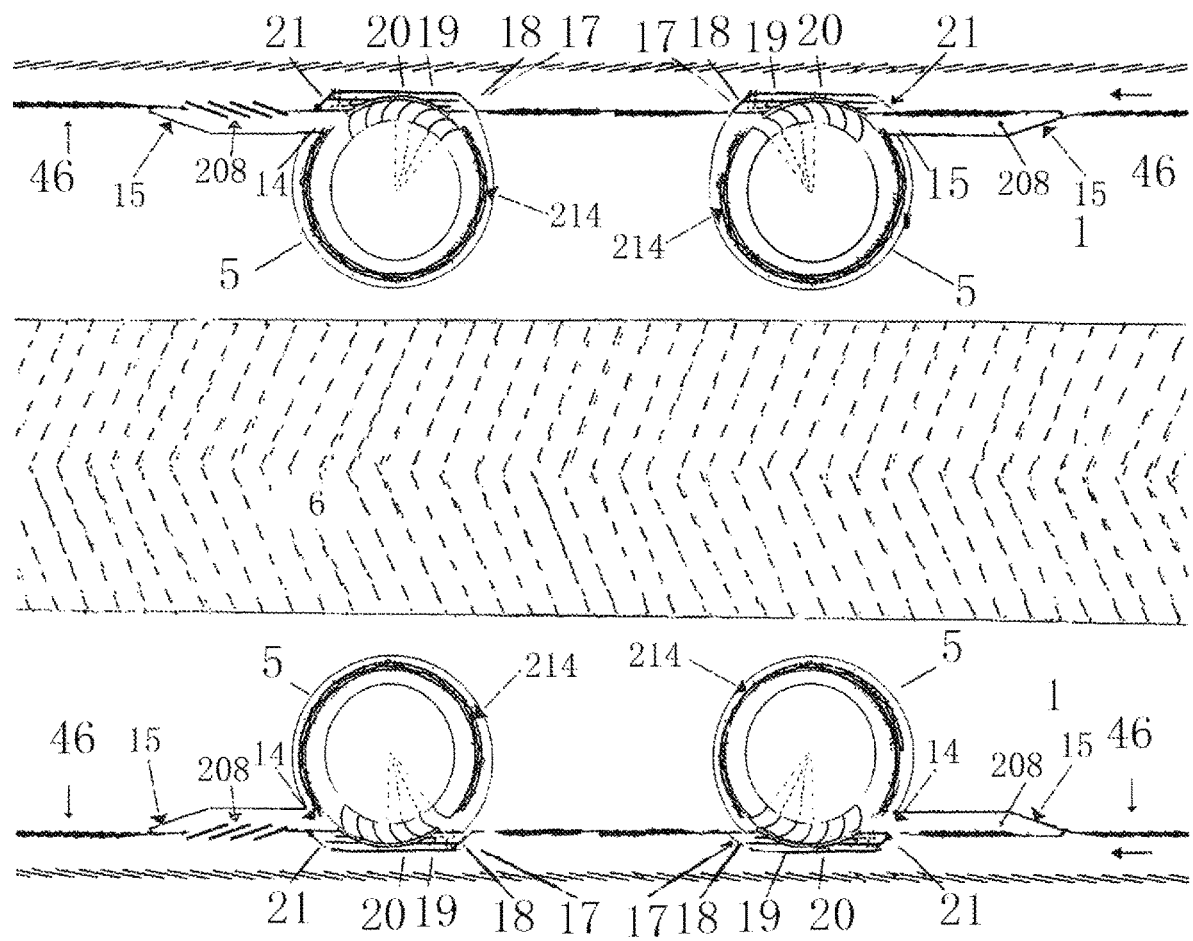
FIG. 13B is a schematic diagram of application of a double-group single-direction negative pressure air suction type fluid-driven power machine applied to a wheel-rail train.
Figure 13C:
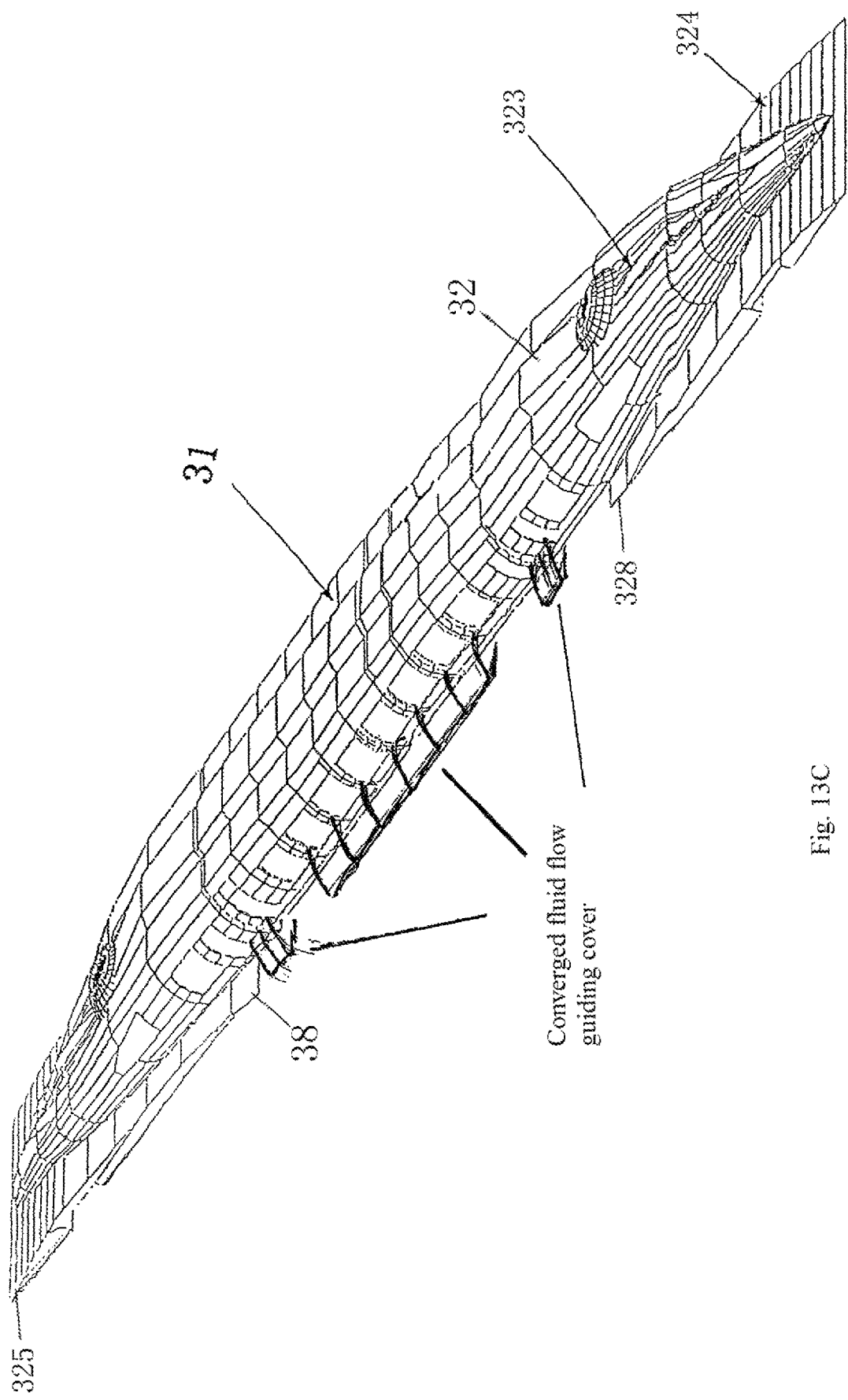
FIG. 13C is a basic shape of a wheel-rail train.
Figure 13D:
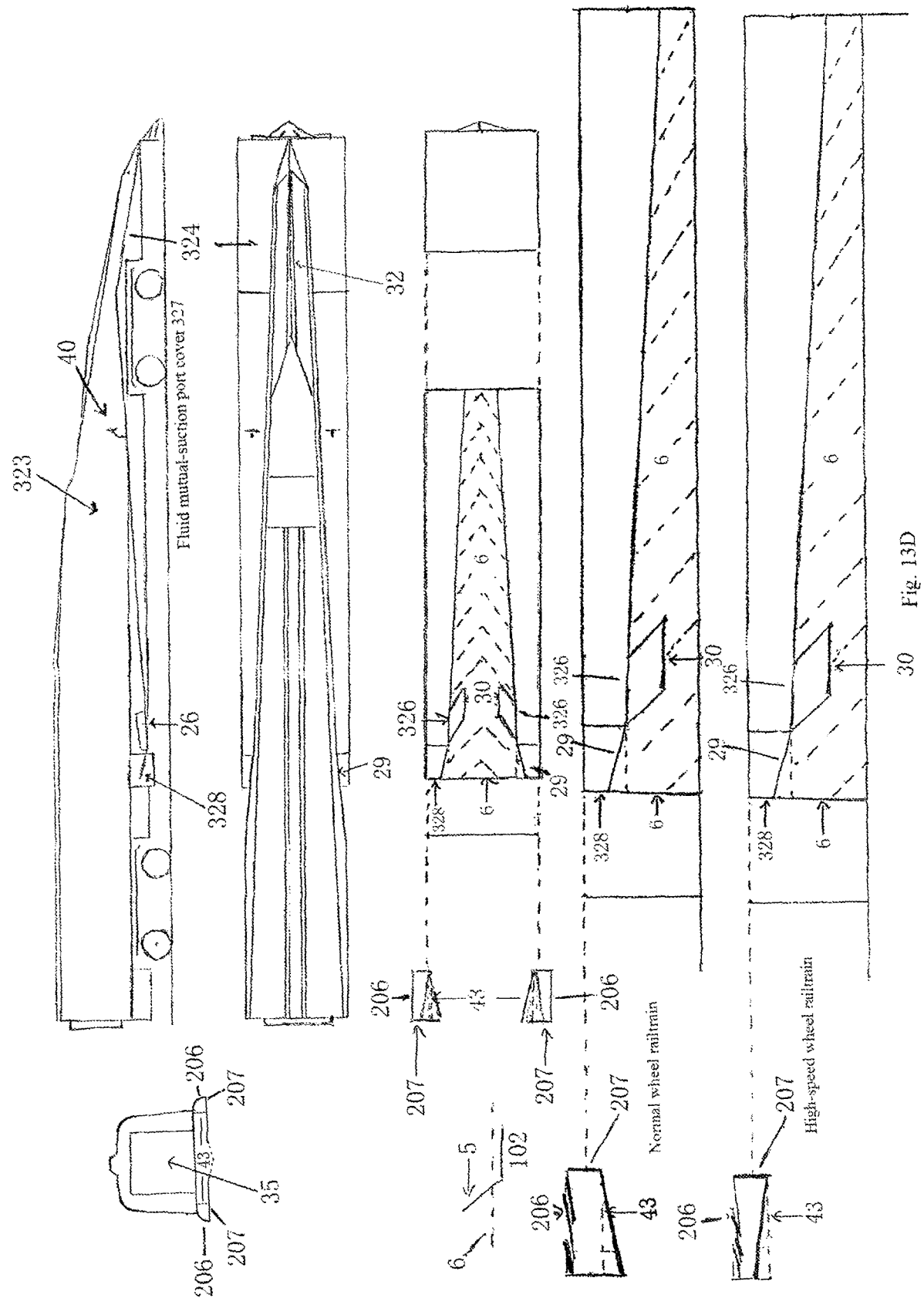
FIG. 13D is a structural schematic diagram of some applications of a front vehicle body of a train.
Figure 13E:
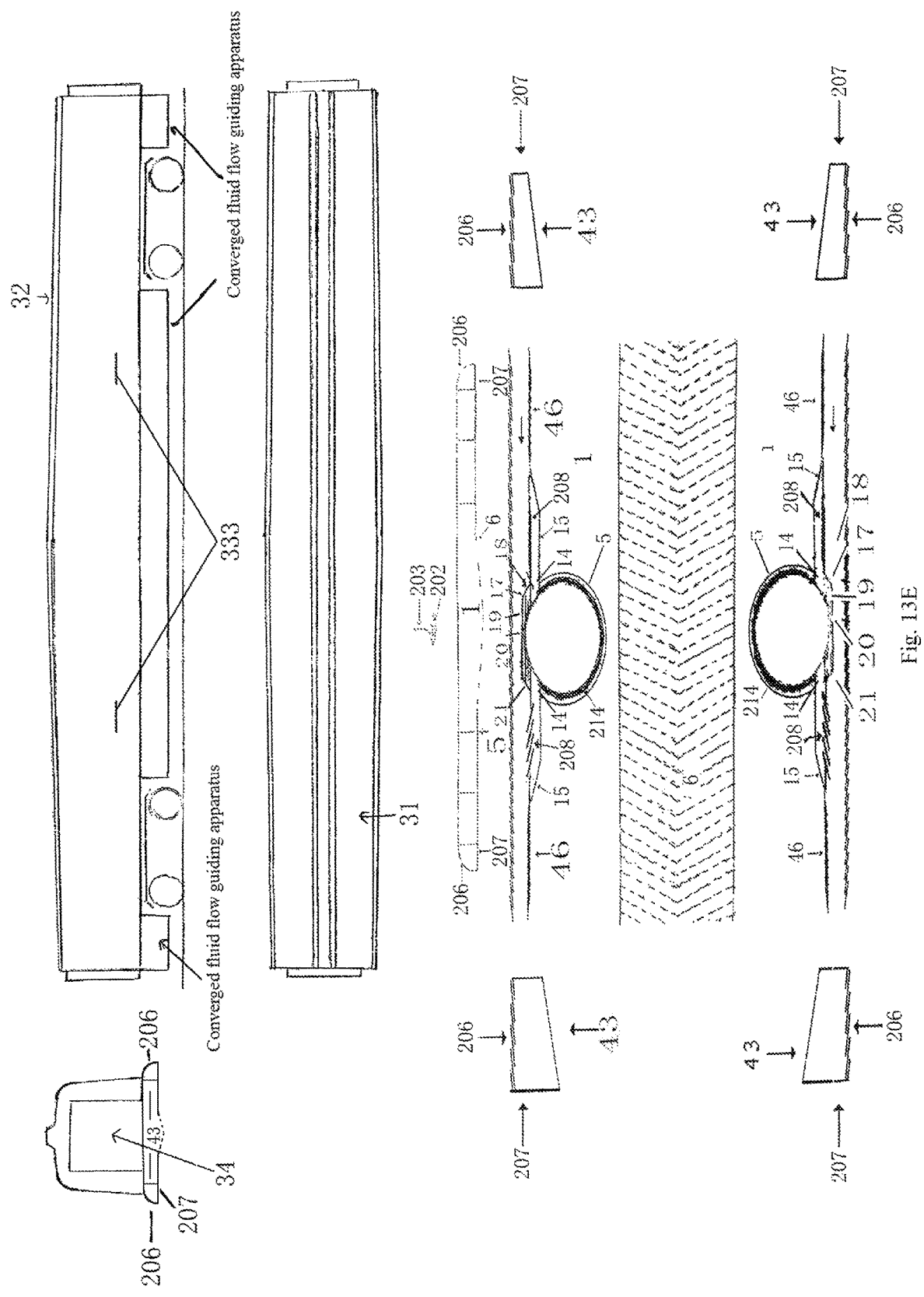
FIG. 13E is a structural schematic diagram of some applications of a train vehicle.
Figure 13F:
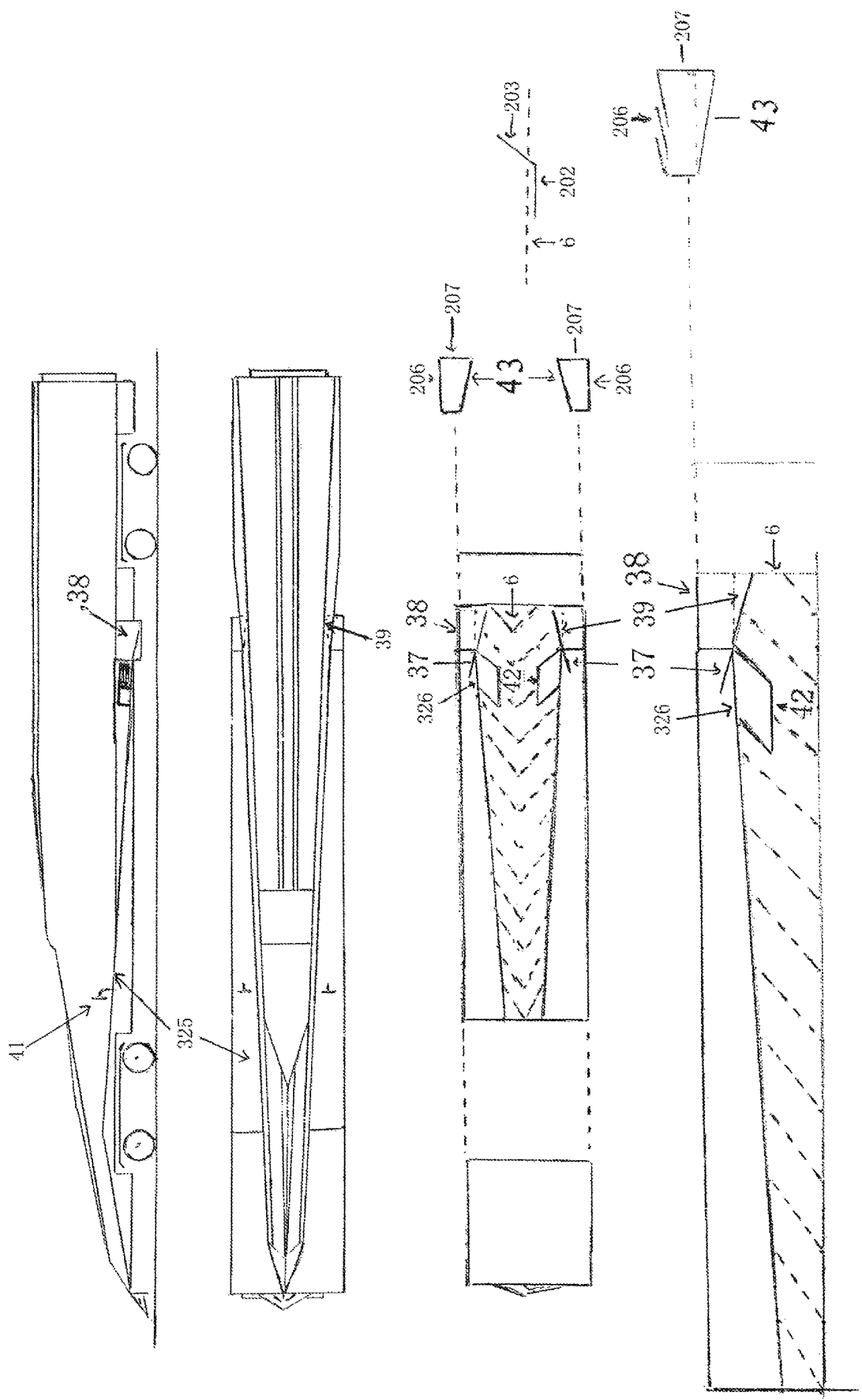
FIG. 13F is a structural schematic diagram of some applications of a rear vehicle body of a train.
Figure 13G:
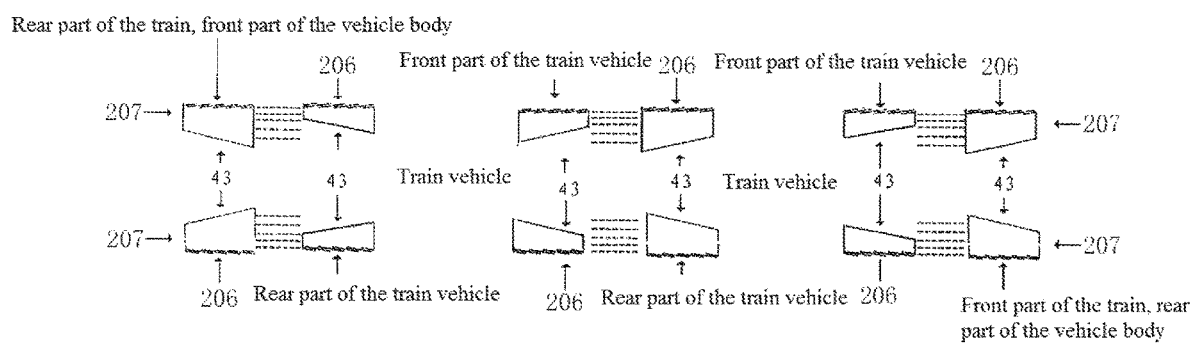
FIG. 13G is a schematic diagram of convection of fluids converged between vehicle bodies along bottoms of both sides of a train.

Part of the converged fluid flowing to the adjacent vehicle along the lower parts of both sides of the front inducing vehicle body of the train flows into the bottom of the adjacent vehicle under the guidance of the converged fluid flow guiding division plates 43, thereby providing more gravity acceleration fluids for the bottom of the adjacent vehicle and providing an ideal main driving power source (as shown in FIG. 13G) for the negative pressure air suction type fluid-driven power machine of the adjacent vehicle. Part of the converged fluid flowing to the adjacent vehicle flows into the inner side of the converged fluid flow guiding apparatus composed of the converged fluid and turbine driving fluid convection louvers 208, the converged fluid flow guiding louvers 206, the converged fluid and vehicle body bottom fluid separation plates 207 at the middle of the vehicle under the guidance of the converged fluid flow guiding apparatus composed of the converged fluid flow guiding louvers 206, the converged fluid and vehicle body bottom fluid separation plates 207 and the converged fluid flow guiding division plates 43 on the front part of the vehicle. The converged fluid flowing into the inner side of the converged fluid flow guiding apparatus provides an ideal power source for the external driving fluid for driving the turbine driving blades 9 in a process of flowing to the direction opposite to the running of the train, and also forms an ideal negative pressure air suction type auxiliary power source of the negative pressure air suction type fluid-driven power machine.

When the negative pressure air suction type fluid-driven power machine is applied to a high-speed wheel-rail train, the running mode of the high-speed wheel-rail train should be changed due to non-arbitrary floatability of the running gravity center of the high-speed wheel-rail train. Before the train runs, the rear part of the converged fluid flow guiding division plate 43 of the front vehicle body (23) of the train slightly moves outwards to the bottom center line direction of the train; the converged fluid flow guiding division plate 43 on the front part of the train inducing vehicle does not move; and the rear part of the converged fluid flow guiding division plate 43 on the rear part of the train inducing vehicle slightly moves outwards to the bottom center line direction of the train (as shown in FIG. 13H).

During running of the high-speed wheel-rail train, part of the converged fluid flowing to the adjacent vehicle along the lower parts of both sides of the front inducing vehicle body of the train also flows into the bottom of the adjacent vehicle (the pressure difference phenomenon of the fluid) due to the mutual suction phenomenon between the converged fluid and the fluid flowing to the direction opposite to the running of the train along the bottom of the train under the guidance of the converged fluid flow guiding division plate 43 in a process of flowing to the adjacent vehicle, thereby providing some gravity acceleration fluids for the bottom of the adjacent vehicle and providing some main driving power sources for the negative pressure air suction type fluid-driven power machine of the adjacent vehicle. Part of the converged fluid flowing to the adjacent vehicle flows into the inner side of the converged fluid flow guiding apparatus composed of the converged fluid and turbine driving fluid convection louvers 208, the converged fluid flow guiding louvers 206, the converged fluid and vehicle body bottom fluid separation plates 207 at the middle of the vehicle under the guidance of the converged fluid flow guiding apparatus composed of the converged fluid flow guiding louvers 206, the converged fluid and vehicle body bottom fluid separation plates 207 and the converged fluid flow guiding division plates 43 on the front part of the vehicle. The converged fluid flowing into the inner side of the converged fluid flow guiding apparatus provides an ideal power source for the external driving fluid for driving the turbine driving blades 9 in a process of flowing to the direction opposite to the running of the train, and also forms an ideal negative pressure air suction type auxiliary power source of the negative pressure air suction type fluid-driven power machine.

Figure 10:
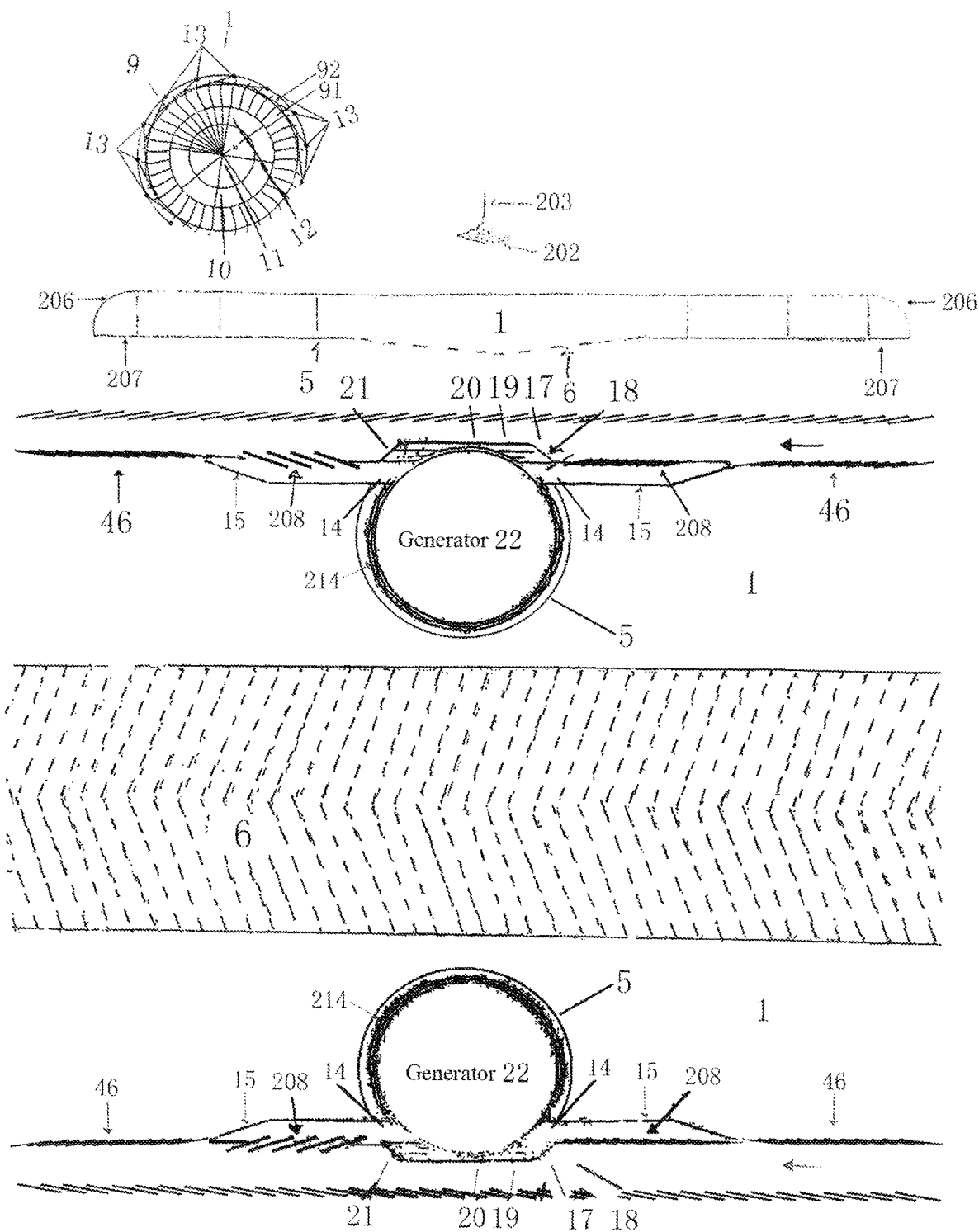
FIG. 10 is a schematic diagram of application of a negative pressure air suction type fluid-driven power machine applied to a wheel-rail train.

As shown in FIG. 10, FIG. 13A and FIG. 13E, during running of the train, the gravity acceleration fluid flowing to the direction opposite to the running of the train along the bottom of the train vehicle generates an uplift phenomenon, so that part of fluid flowing to the direction opposite to the running of the train along the bottom of the train flows into the fluid pressure accumulation bin 1 through the pressure accumulation fluid flow guiding plate 202, the fluid guiding plate 203 and the fluid filtering net 6 to form a pressure accumulation fluid. The pressure accumulation fluid drives the turbine driving blades 9 through the fluid dust collection net 5, the flow guiding apparatus 214 surrounding peripheries of the turbine driving blades for driving the fluid to flow, and the nozzles 13 surrounding peripheries of the turbine driving blades for driving the fluid to flow into the necking port. A plurality of driven turbine driving blades 9 easily drive the turbine shaft 11 by a plurality of hidden levers formed by the turbine bracket 12 and the turbine shaft 11. The part of converged fluid flowing to the direction opposite to the running of the train along the inner side of the converged fluid flow guiding apparatus composed of the converged fluid flow guiding louvers 206, the converged fluid and vehicle body bottom fluid separation plates 207 and the converged fluid and turbine driving fluid convection louvers 208 drives the turbine driving blades 9 through the external driving fluid filtering net 18, the external driving fluid flow inlet 17, the external driving fluid flow guiding cover 19 and the nozzles 20 for an external driving fluid to flow out of the necking port. When driving the turbine driving blades 9, the external driving fluid induces the plurality of turbine driving fluids sprayed by the nozzles 13 surrounding peripheries of the turbine driving blades for driving the fluid to flow into the necking port to flow into the inner side of the negative pressure flow guiding cover 16 through the turbine fluid outlet 14. The plurality of turbine driving fluids flowing into the negative pressure flow guiding cover 15 are rapidly sucked out by the converged fluid through the converged fluid and turbine driving fluid convection louvers 208.

As shown in FIG. 13B, the negative pressure air suction type fluid-driven power machine applied to the wheel-rail train can also be a double-group single-direction negative pressure air suction type fluid-driven power unit, thereby generating double-group single-direction converged fluid and turbine driving fluid convection louvers and generating a double-group single-direction external driving fluid flow inlet. Before the train runs, the corresponding converged fluid flow guiding louvers, the corresponding converged fluid and turbine driving fluid convection louvers and external driving fluid flow inlet of the negative pressure air suction type fluid-driven power machine, and the corresponding flow guiding apparatus surrounding peripheries of the turbine driving blades for driving the fluid to flow are adjusted according to a running direction of the train; the converged fluid and turbine driving fluid convection louvers and the external driving fluid flow inlet of the negative pressure air suction type fluid-driven power machine in opposite directions are closed; the flow guiding apparatus surrounding peripheries of the turbine driving blades for driving the fluid to flow of the negative pressure air suction type fluid-driven power machine in an opposite direction is closed; and work of the negative pressure air suction type fluid-driven power unit in the opposite direction is stopped. During running of the train, only the corresponding negative pressure air suction type fluid-driven power unit works. The working mode of the double-group single-direction negative pressure air suction type fluid-driven power unit is basically the same as that of a single-group double-direction negative pressure air suction type fluid-driven power unit.

The pressure intensity of the turbine driving fluids is adjusted by the pressure reducing grooves and the pressure boosting grooves inside and outside the turbine driving blades.

The rotating turbine shaft drives the electric generator 22 to generate electricity. The electric energy generated by the electric generator 22 is combined with an original driving electric energy of the train driving motor and supplies power to the train driving motor under the control of the electric energy conversion apparatus. When the electric energy generated by the electric generator reaches or exceeds the electric energy required by the train driving motor, under the control of the electric energy conversion apparatus, the storage battery of the train can be charged while the supply of an original driving electric energy source of the train driving motor is stopped.

When the electric generator has a failure or the negative pressure air suction type fluid-driven power machine cannot work, the external driving fluid-inlet intercepting cover 21 and the converged fluid and turbine driving fluid convection louvers 208 are closed; the flow guiding apparatus 214 surrounding peripheries of the turbine driving blades for driving the fluid to flow is closed; and the work of the negative pressure air suction type fluid-driven power machine is stopped.

Part of the above are generating and working processes of the power source of the negative pressure air suction type fluid-driven power machine carried by the wheel-rail train.

During running of the wheel-rail train, under guidance of the converged fluid flow guiding division plates 43 of the converged fluid flow guiding apparatus connected with the rear vehicle body on the rear part of the train vehicle, when the part of converged fluid flowing into the converged fluid flow guiding apparatus composed of the converged fluid flow guiding louvers 206, the converged fluid and vehicle body bottom fluid separation plates 207 and the converged fluid flow guiding division plates 43 of the rear vehicle body flows to the rear part of the train, because the front part of the rear vehicle body wing flap 38 slightly swings downwards and the wing flap baffle 39 slightly moves inwards, many fluids at the bottom of the rear vehicle body are sucked out by the wing flap 38 and the wing flap baffle 39 when the converged fluid flows through the above position and a negative pressure phenomenon appears at the bottom of the rear vehicle body. Through the negative pressure phenomenon at the bottom of the rear vehicle body, the converged fluid flowing through the outer side of the fluid mutual-suction port 326 semi-closed by the fluid mutual-suction port cover 37 of the rear vehicle body and flowing to the rear part of the train flows to the upper part of the flow guiding wing 325 of the rear vehicle body in a converging mode (the mutual suction phenomenon of the fluids), thereby forming an ideal negative (bent) pressure protection phenomenon of the train running gravity center of the rear vehicle body. Meanwhile, when the converged fluid flows to the rear part of the train in the converging mode, the flow rate of the fluid flowing to the rear part of the train is increased, and the capability of the fluid flowing to the rear part of the train to resist the negative pressure air suction effect of the train is improved.

The fluid velocity detection apparatus 333 at the middle of the train adjusts the auxiliary fluid velocity generated by the auxiliary propeller so that the flow velocity of the fluid flowing to the direction opposite to the running of the train along the lower parts of both sides of the train is relatively uniform.

The auxiliary propeller also increases the flow velocity of the converged fluid flowing to the direction opposite to the running of the train and reduces a lot of air resistance during running of the train while adjusting the flow velocity of the fluid flowing to the direction opposite to the running of the train along both sides of the train.

During running of the train, in order to reduce a wind resistance phenomenon of the converged fluid flow guiding louvers, part of the converged fluid flow guiding louvers 206 can be reduced in opening degree or closed. When braking deceleration is required during running of the train, the auxiliary propellers on the front part and the rear part of the train are closed, and the converged fluid flow guiding louvers 206 can be opened, to improve the effect of braking deceleration of the train by means of the wind resistance phenomenon of the converged fluid flow guiding louvers 206. During running of the train, when the train running safety is endangered and the emergency stop is required, the hidden wind-resistance brake plates are opened while the emergency braking of the train is adopted; the opening degree of the converged fluid flow guiding louvers is increased; and the wind resistance braking is utilized to assist the emergency braking of the train. Meanwhile, automatic-adjustment apparatuses of the converged fluid flow guiding division plates and the like are utilized to slightly move the front part of the converged fluid flow guiding division plates on the front parts of the train inducing vehicles of the high-speed wheel-rail train and an ordinary wheel-rail train inwards to the bottom center line direction of the train. The fluid pressure accumulation bin decompression louvers 46 is opened; and the rear parts of the converged fluid flow guiding division plates on the rear part of the front vehicle body of the ordinary wheel-rail train and on the rear part of the train vehicle are slightly moved outwards to the outer side of the bottom center line direction of the train, so as to increase the amount of the collected converged fluids of the converged fluid flow guiding division plate on the front part of the train inducing vehicle, improve the adsorption force of the converged fluid flowing to the direction opposite to the running of the train along the lower parts of both sides of the train to the fluids flowing to the direction opposite to the running of the train along both sides and the upper part of the train, improve a bent decompression phenomenon of the train running resistance fluid to the train running gravity center, decrease the phenomenon (the fluid pressure difference phenomenon) of absorbing the converged fluid by the fluid flowing to the direction opposite to the running of the train along the bottom of the train when the converged fluid flows through the connected part between the vehicles, and reduce the buoyancy force generated by the gravity acceleration fluid from the fluid flowing to the direction opposite to the running of the train along the bottom of the train for the train running gravity center. The bent decompression phenomenon of the running resistance fluid of the wheel-rail train to the running gravity center of the wheel-rail train is improved, the buoyancy force of the fluid flowing to the direction opposite to the running of the train along the bottom of the train for the running gravity center of the train is reduced, and the wind resistance braking of the wheel-rail train is combined, so as to improve the effect of braking deceleration of the train, shorten the time and distance for the braking deceleration of the train, and also overcome some influences (a floating phenomenon of the running gravity center of the wheel-rail train) caused when a gravity acceleration pressure accumulation fluid is provided for the fluid pressure accumulation bin of the negative pressure air suction type fluid-driven power machine.

Under device-allowable conditions, the auxiliary propeller on the front part of the train can be rotated reversely, and a train running reverse fluid created by the auxiliary propeller is utilized to improve the wind resistance braking effect of the train.

Through the streamline-supported induction method of the above wheel-rail train, during the running of the wheel-rail train, an ideal working mode of the negative pressure air suction type fluid-driven power machine carried by the wheel-rail train is formed when the bent decompression protection for the running gravity center of the wheel-rail train is formed by the running resistance fluid of the wheel-rail train, when the running resistance fluid of the wheel-rail train can provide an ideal driving power source for the negative pressure air suction type fluid-driven power machine carried by the train, when the wheel-rail train runs stably, safely and comfortably, and when the driver of the wheel-rail train can control the running of the train.

What is claimed is:

1. A negative pressure air suction type fluid-driven power machine, comprising a fluid pressure accumulation bin, a necking port for a fluid to flow into the fluid pressure accumulation bin, a flow inlet for the fluid to flow into the fluid pressure accumulation bin, a flow guiding cover for the fluid to flow into the fluid pressure accumulation bin, a fluid-inlet flow guiding cover, turbine driving blades, a turbine housing, a turbine shaft, a turbine bracket, nozzles surrounding peripheries of the turbine driving blades for driving the fluid to flow into the necking port, a turbine fluid outlet, a fluid negative-pressure flow guiding cover, a fluid negative-pressure outlet, an external driving fluid flow inlet, an external driving fluid flow guiding cover and nozzles for external driving fluid to flow out of the necking port, wherein during running, after accumulating pressure through the flow inlet for the fluid to flow into the fluid pressure accumulation bin, the fluid-inlet flow guiding cover, the flow guiding cover for the fluid to flow into the fluid pressure accumulation bin, the necking port for the fluid to flow into the fluid pressure accumulation bin and the fluid pressure accumulation bin for the fluid to flow in, a first fluid flows through the nozzles surrounding peripheries of the turbine driving blades for driving the fluid to flow into the necking port to drive the turbine driving blades and also induce driving fluids to flow to the turbine fluid outlet;

a plurality of driven turbine driving blades drive the turbine shaft to output power through a plurality of hidden levers formed by the turbine bracket and a turbine shaft axis;

a second fluid drives the turbine driving blades through the external driving fluid flow inlet, the external driving fluid flow guiding cover and the nozzles for external driving fluid to flow out of the necking port, and also induces the driving fluids to flow from the turbine fluid outlet and to flow into the fluid negative-pressure flow guiding cover;

running resistance fluid flows to the direction opposite to the running of the negative pressure air suction type fluid-driven power machine through exteriors of the fluid negative-pressure flow guiding cover and the fluid negative-pressure outlet, and a negative pressure-assisted air suction force is formed outside the fluid negative-pressure outlet to promote the turbine driving fluid to be discharged from the interior of the fluid negative-pressure flow guiding cover.

2. The negative pressure air suction type fluid-driven power machine according to claim 1, wherein pressure reducing grooves and pressure boosting grooves are formed inside and outside the turbine driving blades to adjust the pressure intensity of the turbine driving fluid.

3. The negative pressure air suction type fluid-driven power machine according to claim 1, wherein the negative pressure air suction type fluid-driven power machine further comprises a fluid dust collection net and a fluid filtering net for purifying the first fluid, and further comprises an external driving fluid filtering net for purifying the second fluid.

4. The negative pressure air suction type fluid-driven power machine according to claim 1, wherein the negative pressure air suction type fluid-driven power machine further comprises a fluid-inlet intercepting cover for intercepting the first fluid, and further comprises an external driving fluid-inlet intercepting cover for intercepting the second fluid.

5. The negative pressure air suction type fluid-driven power machine according to claim 1, wherein the negative pressure air suction type fluid-driven power machine is applied to an airflow-assisted bicycle;

a power assisting transmission apparatus is added; and the turbine shaft drives a bicycle driving wheel disk to rotate through the power assisting transmission apparatus.

6. The negative pressure air suction type fluid-driven power machine according to claim 1, wherein the negative pressure air suction type fluid-driven power machine is applied to an electric bicycle or an electric motorcycle using solar photovoltaics and airflow to generate electricity; solar photovoltaic batteries, an electric energy conversion apparatus, a storage battery and an electric generator are added; and the electric generator is driven by the turbine shaft to generate electricity so as to drive a driving motor of the electric bicycle or the electric motorcycle and/or charge the storage battery.

7. The negative pressure air suction type fluid-driven power machine according to claim 6, wherein when electric energy generated by the electric generator and the solar photovoltaic batteries reaches or exceeds the electric energy required by the working of the driving motor, the exceeding portion is used to charge the storage battery.

8. The negative pressure air suction type fluid-driven power machine according to claim 1, wherein the negative pressure air suction type fluid-driven power machine further comprises a flow guiding plate for fluid to flow into the fluid pressure accumulation bin, a convective fluid-inlet flow guiding cover, a flow guiding motor and a flow guiding propeller;

the first fluid also passes through the convective fluid-inlet flow guiding cover and the flow guiding plate for fluid to flow into the fluid pressure accumulation bin;

the second fluid also flows to the flow guiding propeller through the convective fluid-inlet flow guiding cover;

the flow guiding propeller is driven by the flow guiding motor so as to reduce obstruction when the fluid accumulates the pressure, and improve the flow rate of fluids flowing into the fluid pressure accumulation bin.

9. The negative pressure air suction type fluid-driven power machine according to claim 8, wherein the negative pressure air suction type fluid-driven power machine further comprises a converged fluid-inlet filtering net and a converged fluid-inlet intercepting cover.

10. The negative pressure air suction type fluid-driven power machine according to claim 8, wherein the negative pressure air suction type fluid-driven power machine is applied to an electric vehicle using solar photovoltaics and airflow to generate electricity;

solar photovoltaic batteries, a storage battery, a secondary electric energy conversion apparatus, an electric generator and a flow guiding plate at a rear part of the vehicle body are added;

the electric generator is driven by the turbine shaft to generate electricity to drive a secondary driving motor of the electric vehicle and/or charge the storage battery; and the running resistance also flows through the flow guiding propeller and the flow guiding plate at the rear part of the vehicle body.

11. The negative pressure air suction type fluid-driven power machine according to claim 10, wherein
a converged fluid flow guiding apparatus is configured to guide part of resistance fluid in the running of the electric vehicle to improve running stability and comfort.

12. The negative pressure air suction type fluid-driven power machine according to claim 11, wherein
the converged fluid flow guiding apparatus comprises a converged fluid flow guiding cover, as well as converged fluid flow inlets on a front part and both sides of the vehicle body.

13. The negative pressure air suction type fluid-driven power machine according to claim 8, wherein
the negative pressure air suction type fluid-driven power machine is applied to a ship or the aircraft using solar photovoltaics and airflow to generate electricity;
solar photovoltaic batteries, a storage battery, a secondary electric energy conversion apparatus and an electric generator are added; and
the electric generator is driven by the turbine shaft to generate electricity to drive the ship or the aircraft and/or charge the storage battery.

14. The negative pressure air suction type fluid-driven power machine according to claim 1, wherein
the negative pressure air suction type fluid-driven power machine is applied to a wheel-rail train;
the necking port for fluid to flow into the fluid pressure accumulation bin, the flow inlet for the fluid to flow into the fluid pressure accumulation bin, the fluid-inlet flow guiding cover and the fluid negative-pressure outlet are replaced with the added fluid guiding plate, converged fluid flow guiding louvers, a converged fluid and vehicle body bottom fluid separation plate, converged fluid and turbine driving fluid convection louvers and a flow guiding apparatus surrounding peripheries of the turbine driving blades for driving the fluid to flow;
the storage battery and the electric generator are also added; and
the electric generator is driven by the turbine shaft to generate electricity to drive a driving motor of the wheel-rail train and/or charge the storage battery.

15. The negative pressure air suction type fluid-driven power machine according to claim 14, wherein
a front flow guiding wing and a rear flow guiding wing are respectively mounted on an inducing vehicle body, a front vehicle body and a rear vehicle body of the wheel-rail train;
a fluid mutual-suction port and a fluid mutual-suction port cover are arranged on a side surface of the inducing vehicle body connected with a middle part to a rear part of the front flow guiding wing;
a wing flap is mounted on a rear side of the front flow guiding wing;
a wing flap baffle is arranged at a connected part between the wing flap and the side surface of the inducing vehicle body;
a fluid flow outlet connected with the fluid mutual-suction port is formed in the bottom of the front vehicle body;
bent compression wings are arranged on both sides of the top of the inducing vehicle body; a central dividing line is arranged at the top of the inducing vehicle body;
a fluid velocity detection apparatus is arranged at the middle of the train;
a cross-sectional area of the middle of a train inducing vehicle is greater than cross-sectional areas of both ends;
a fluid mutual-suction port and a fluid mutual-suction port cover are arranged on a side surface of the inducing vehicle body connected with a middle part to a rear part of the rear flow guiding wing of the rear vehicle body of the train;
a rear wing flap is arranged on a front part of the rear flow guiding wing;
a wing flap baffle is arranged at a connected part between the rear wing flap and the side surface of the inducing vehicle body;
auxiliary propeller groups are mounted at the middle of the front flow guiding wing and the side surface of the inducing vehicle body;
auxiliary propeller groups are mounted at the middle of the rear flow guiding wing and the side surface of the inducing vehicle body;
a fluid flow outlet connected with the fluid mutual-suction port is formed in the bottom of the rear vehicle body;
a pressure accumulation fluid flow guiding plate and a fluid guiding plate are arranged at the bottom of the inducing vehicle body;
converged fluid flow guiding louvers, converged fluid and vehicle body bottom fluid separation plates, converged fluid flow guiding division plates, automatic-adjustment apparatuses of converged fluid flow guiding louver and automatic-adjustment apparatuses of converged fluid flow guiding division plate are arranged on lower parts of both sides of the inducing vehicle body;
a fluid pressure accumulation bin and converged fluid and turbine driving fluid convection louvers are arranged at the bottom of the train inducing vehicle;
partially hidden wind-resistance brake plates are mounted on lower middle parts of both sides of the train inducing vehicle body; and
pressure accumulation bin decompression louvers are arranged beside the converged fluid and turbine driving fluid convection louvers of the train vehicle.

16. The negative pressure air suction type fluid-driven power machine according to claim 14, wherein
the converged fluid and turbine driving fluid convection louvers is configured to close the flow guiding apparatus surrounding peripheries of the turbine driving blades for driving the fluid to flow.

17. The negative pressure air suction type fluid-driven power machine according to claim 14, wherein
a fluid velocity detection apparatus and auxiliary propellers are also added;
the fluid velocity detection apparatus is configured to adjust a rotating direction and/or rotating velocity of the auxiliary propellers; and
the auxiliary propellers are used to adjust the flow velocity of the fluid flowing to the direction opposite to the running of the wheel-rail train.

18. The negative pressure air suction type fluid-driven power machine according to claim 14, wherein
the wind-resistance brake plates are also added to adjust the running wind resistance of the wheel-rail train through the converged fluid flow guiding louver.

* * * * *